US012231389B2

(12) United States Patent
Gao

(10) Patent No.: US 12,231,389 B2
(45) Date of Patent: *Feb. 18, 2025

(54) COMMUNICATION METHOD, GATEWAY, AND MANAGEMENT METHOD AND APPARATUS IN HYBRID CLOUD ENVIRONMENT

(71) Applicant: Huawei Cloud Computing Technologies Co., Ltd., Guizhou (CN)

(72) Inventor: Zhonghua Gao, Beijing (CN)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,178

(22) Filed: Dec. 21, 2023

(65) Prior Publication Data

US 2024/0154928 A1  May 9, 2024

Related U.S. Application Data

(63) Continuation of application No. 17/570,184, filed on Jan. 6, 2022, now Pat. No. 11,888,809, which is a (Continued)

(30) Foreign Application Priority Data

Sep. 6, 2019   (CN) .......................... 201910844549.1
Dec. 31, 2019  (CN) .......................... 201911419113.4

(51) Int. Cl.
*H04L 12/46*   (2006.01)
*H04L 61/103*  (2022.01)
*H04L 101/668* (2022.01)

(52) U.S. Cl.
CPC ............ *H04L 61/103* (2013.01); *H04L 12/46* (2013.01); *H04L 2101/668* (2022.05)

(58) Field of Classification Search
None
See application file for complete search history.

(56) References Cited

U.S. PATENT DOCUMENTS 9,154,327 B1  10/2015 Marino et al.
11,032,369 B1  6/2021  Wei
(Continued)

FOREIGN PATENT DOCUMENTS

CN   103404084 A   11/2013
CN   105591955 A   5/2016
(Continued)

OTHER PUBLICATIONS

L. Dunbar et al.,"Practices for Scaling ARP and Neighbor Discovery {ND} in Large Data Centers", Request for Comments: 7342, Aug. 2014, total 14 pages.
(Continued)

*Primary Examiner* — Angela Nguyen
(74) *Attorney, Agent, or Firm* — Rimon PC

(57) ABSTRACT

This application provides a communication method, a gateway, and a management method and apparatus. A first data center is configured to provide non-public cloud services, and a second data center is configured to provide public cloud services. A gateway configured in the second data center is connected to a first subnet of the first data center, and is connected to a second subnet of the second data center. The first subnet and the second subnet have a same private network segment. The method includes: a layer 2 gateway receives a first address resolution protocol (ARP) request packet, which is used to request a MAC address of a second device in the second subnet, sent by a first device in the first subnet, and the gateway sends the first ARP reply packet, which carries a first MAC address of the gateway, to the first device.

19 Claims, 28 Drawing Sheets

Related U.S. Application Data continuation of application No. PCT/CN2020/113850, filed on Sep. 7, 2020.

(56) References Cited

U.S. PATENT DOCUMENTS

| | | |
|---|---|---|
| 2016/0352682 A1 | 12/2016 | Chang et al. |
| 2017/0099188 A1 | 4/2017 | Chang et al. |
| 2017/0302553 A1 | 10/2017 | Zafer et al. |

FOREIGN PATENT DOCUMENTS

| | | | |
|---|---|---|---|
| CN | 106921551 | A | 7/2017 |
| CN | 107800743 | A | 3/2018 |
| CN | 108347493 | A | 7/2018 |
| JP | 2019516320 | A | 6/2019 |
| WO | 2018137369 | A1 | 8/2018 |
| WO | 2018150222 | A1 | 8/2018 |
| WO | 2019120233 | A1 | 6/2019 |

OTHER PUBLICATIONS

Smoot Carl-Mitchell et al., "Using ARPP to Implement Transparent Subnet Gateways", Request for Comments: 1027, Oct. 1987, total 9 Pages.

Masatoshi Takihiro, "A Subscriber Management Method for Ethernet Access Networks", IEICE Technical Report, 1 vol. 102, No. 694, published by the Institute of Electronics, Information and Communication Engineers of Japan, Apr. 16. 2015, with an English abstract; 13 total pages.

| Interaction interface 1 | |
|---|---|
| Create a layer 2 gateway | |

FIG. 8A

| Interaction interface 2 | |
|---|---|
| Name of a layer 2 gateway: | Layer 2 gateway 200 |
| Local tunnel information: | VPN gateway 303 |
| VPC to which the layer 2 gateway belongs: | VPC 1 |
| Connected subnet in the VPC: | 192.168.0.0/24 |
| Peer tunnel information: | VTEP IP3; VNI0 |
| Whether to create: Yes | Cancel |

FIG. 8B

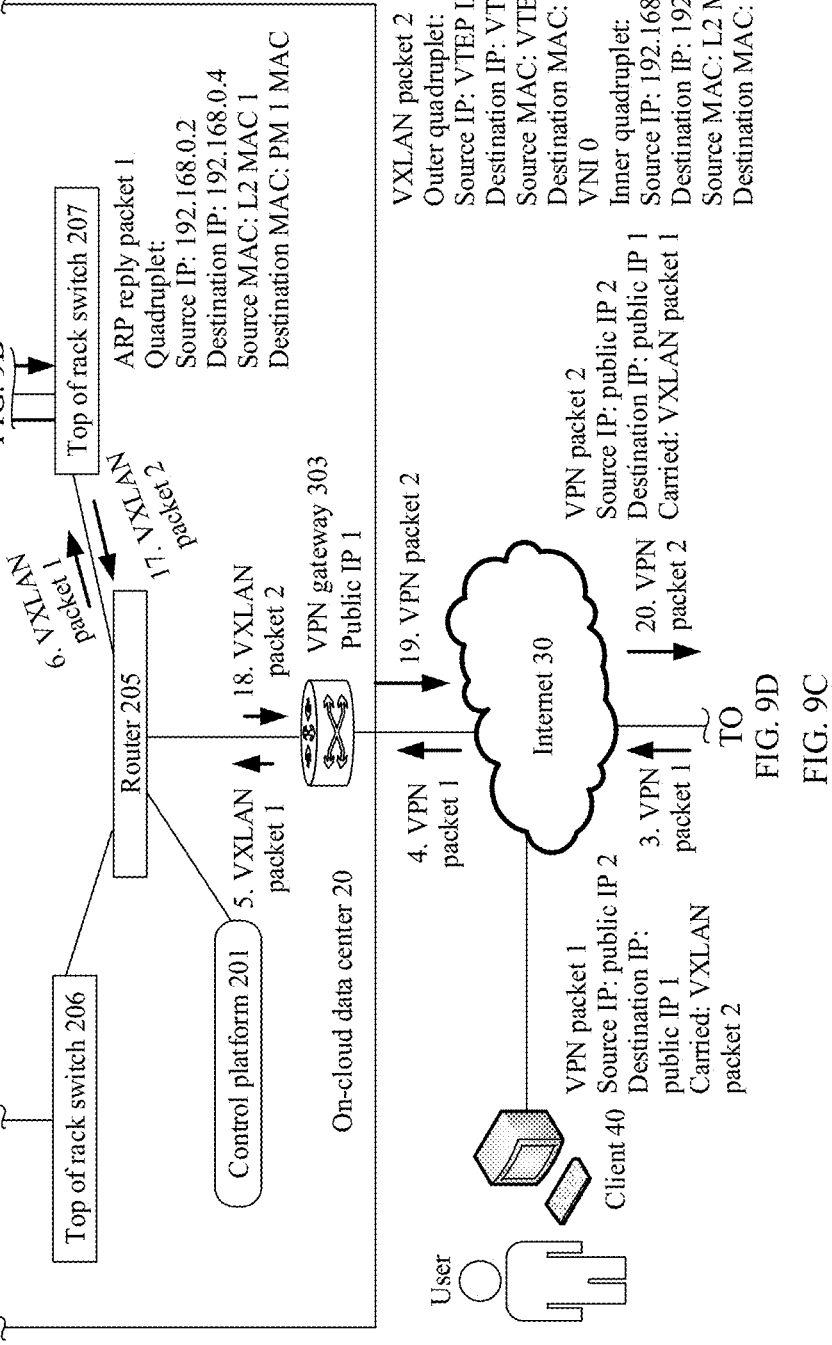

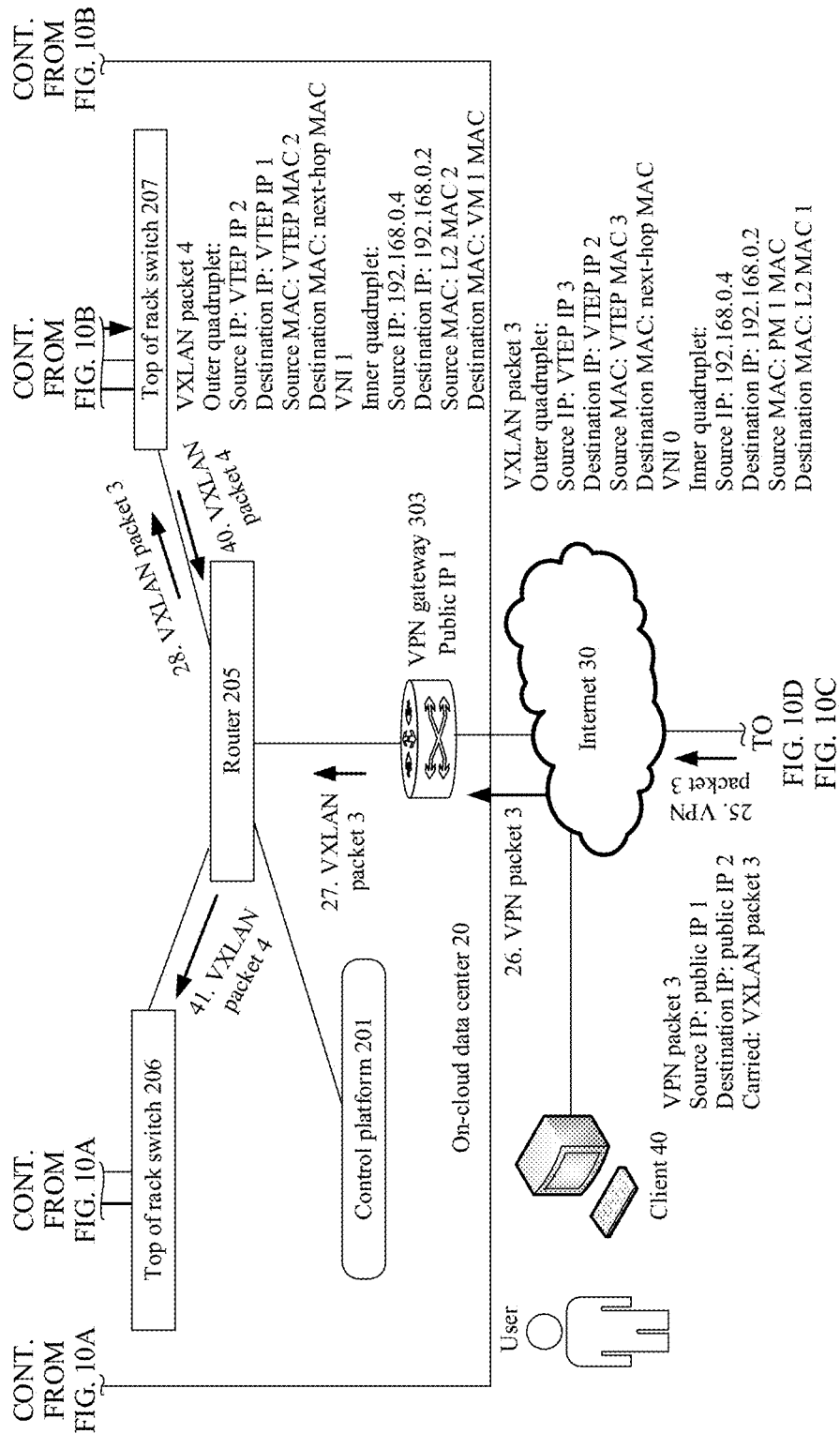

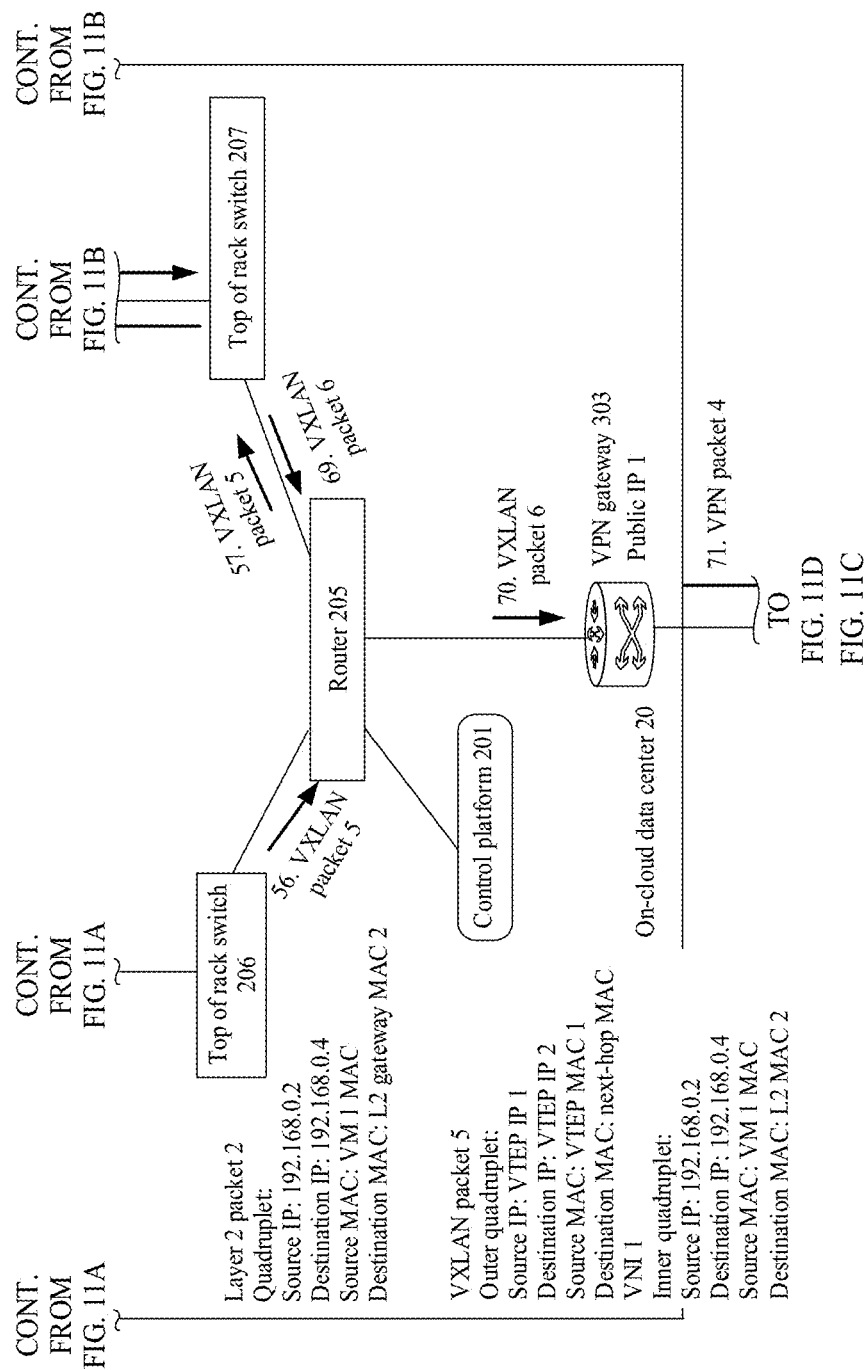

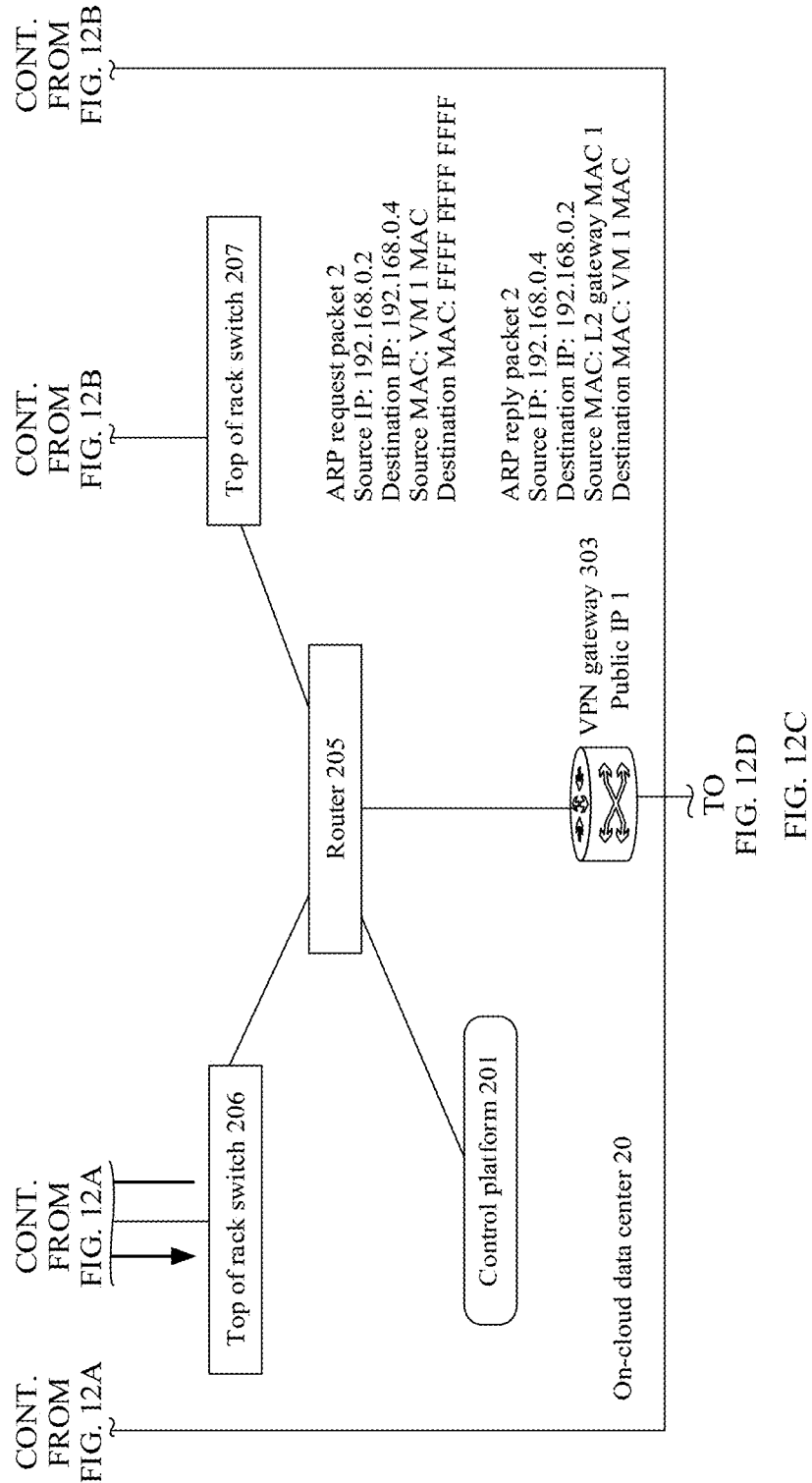

COMMUNICATION METHOD, GATEWAY, AND MANAGEMENT METHOD AND APPARATUS IN HYBRID CLOUD ENVIRONMENT

CROSS-REFERENCE TO RELATED APPLICATIONS

This application is a continuation of U.S. patent application Ser. No. 17/570,184, filed on Jan. 6, 2022, which is a continuation of International Application No. PCT/CN2020/113850, filed on Sep. 7, 2020, which claims priority to Chinese Patent Application No. 201911419113.4, filed on Dec. 31, 2019, and Chinese Patent Application No. 201910844549.1, filed on Sep. 6, 2019. All of the aforementioned patent applications are hereby incorporated by reference in their entireties.

TECHNICAL FIELD

This application relates to the field of cloud technologies, and in particular, to a communication method, a gateway, and a management method and apparatus in a hybrid cloud environment.

BACKGROUND

With the development of cloud technologies, many enterprises are gradually migrating on-premises devices from on-premises data centers to a public cloud, and there is a requirement for layer 2 communication between an on-cloud data center and the on-premises data center. However, for security, the layer 2 communication between the on-cloud data center and the on-premises data center cannot be performed currently, causing restrictions on a communication scenario of a hybrid cloud.

SUMMARY

To resolve a problem in conventional technology, this application provides a communication method, a gateway, a management method, and an apparatus in a hybrid cloud environment, to effectively resolve a technical problem that layer 2 communication between an on-cloud data center and an on-premises data center cannot be performed.

According to a first aspect, this application provides a communication method in a hybrid cloud environment. The method is applied to communication between a first data center and a second data center. The hybrid cloud environment includes the first data center and the second data center. The first data center is configured to provide non-public cloud services, and the second data center is configured to provide public cloud services. A layer 2 gateway is disposed in the second data center, the layer 2 gateway is remotely connected to a first subnet of the first data center through a layer 2 communication tunnel, and is connected to a second subnet of the second data center. The first subnet and the second subnet have a same private network segment. The method includes the following steps. The layer 2 gateway receives a first address resolution protocol (ARP) request packet sent by a first device in the first subnet, where the first ARP request packet is used to request a MAC address of a second device in the second subnet, and the layer 2 gateway sends a first ARP reply packet to the first device, where the first ARP reply packet carries a first MAC address of the layer 2 gateway.

The first ARP request packet is a broadcast packet from the first data center, and the layer 2 gateway in the second data center intercepts the first ARP request packet, to prevent the first ARP request packet from being broadcast in the second data center, and ensure security of the second data center. In addition, the first ARP request packet is intercepted, to prevent the presence of a large quantity of broadcast packets from the first data center in the second data center, and to avoid network load to the first data center caused by a broadcast packet generated by the second data center.

In addition, the layer 2 gateway returns, to the first device, the first ARP reply packet that carries the first MAC address of the layer 2 gateway, and performs non-malicious MAC address spoofing on the first device, so that the first device considers that the MAC address of the second device is the first MAC address of the layer 2 gateway. In this case, from the perspective of the first device, the MAC address of the second device is the first MAC address of the layer 2 gateway. The first ARP reply packet that is broadcast is responded to, and therefore the first device determines that the first device and the second device are located in a same local area network, and the first device may access the second device by accessing the first MAC address of the layer 2 gateway. In this way, layer 2 communication is implemented between the first device and the second device.

With reference to the first aspect, in a possible implementation, when the first ARP request packet and the first ARP reply packet are transmitted through the layer 2 communication tunnel, a source MAC address, a destination MAC address, a source IP address, and a destination IP address of each of the first ARP request packet and the first ARP reply packet remain unchanged.

With reference to the first aspect, in a possible implementation, the layer 2 gateway obtains and records a first correspondence between a private network address of the second device and the MAC address of the second device in the second subnet. After the first device obtains the first MAC address of the layer 2 gateway, when the first device accesses the second device through the layer 2 gateway, the layer 2 gateway modifies, based on the first correspondence, a destination MAC address of a packet sent by the first device from the first MAC address of the layer 2 gateway to the MAC address of the second device, so that the packet can arrive at the second device, and the layer 2 gateway may connect the first subnet and the second subnet by learning and recording the first correspondence.

With reference to the first aspect, in a possible implementation, the layer 2 gateway may receive the first correspondence, sent by a control platform of the second data center, between the private network address of the second device and the MAC address of the second device in the second subnet, and record the first correspondence in a local ARP entry.

The control platform has management permission on a device in the second data center. After the second device is created in the second data center, the control platform records the first correspondence between the private network address of the second device and the MAC address of the second device.

With reference to the first aspect, in a possible implementation, the method further includes the following steps. The layer 2 gateway receives a first packet sent by the first device through the layer 2 communication tunnel. A destination IP address of the first packet includes the private network address of the second device, a destination MAC address of the first packet includes the first MAC address of the layer 2 gateway, a source IP address of the first packet includes a private network address of the first device, and a source MAC address of the first packet includes a MAC address of the first device. The layer 2 gateway obtains the MAC address of the second device from the foregoing recorded first correspondence based on the private network address of the second device carried in the first packet, modifies the destination MAC address of the first packet to the MAC address of the second device, and modifies the source MAC address of the first packet to a second MAC address of the layer 2 gateway. The layer 2 gateway sends a modified first packet to the second device.

After receiving the first ARP reply packet, the first device considers that the MAC address of the second device is the first MAC address of the layer 2 gateway carried in the first ARP reply packet. The first device constructs, based on the first MAC address of the layer 2 gateway, the first packet for the first MAC address of the layer 2 gateway, and sends the first packet to the layer 2 gateway. The layer 2 gateway modifies the MAC address of the first packet, to enable the destination MAC address of the modified first packet to be the MAC address of the second device, and the layer 2 gateway sends the modified first packet to the second device. This implements cross-data center transmission of the first packet from the first device to the second device.

Therefore, the layer 2 gateway may connect the first device and the second device, so that the first device and the second device each consider that both the first device and the second device are in a same local area network.

With reference to the first aspect, in a possible implementation, the source IP address of the first ARP request packet includes a private network address of the first device, the source MAC address of the first ARP request packet includes a MAC address of the first device, and the method further includes the following step: The layer 2 gateway learns and records a second correspondence between the private network address of the first device and the MAC address of the first device.

When the second device accesses the first device through the layer 2 gateway, the layer 2 gateway modifies, based on the second correspondence, a destination MAC address of a packet sent by the second device, so that the packet may arrive at the first device.

With reference to the first aspect, in a possible implementation, after the layer 2 gateway learns and records the second correspondence between the private network address of the first device and the MAC address of the first device, the layer 2 gateway receives a second packet sent by the second device, where a destination IP address of the second packet includes the private network address of the first device, a destination MAC address of the second packet includes a second MAC address of the layer 2 gateway, a source IP address of the second packet includes the private network address of the first device, and a source MAC address of the second packet includes the MAC address of the second device. The layer 2 gateway obtains the MAC address of the first device from the second correspondence based on the private network address of the first device carried in the second packet, modifies the destination MAC address of the second packet to the MAC address of the first device, and modifies the source MAC address of the second packet to the first MAC address of the layer 2 gateway. The layer 2 gateway sends a modified second packet to the first device through the layer 2 communication tunnel.

After receiving the second packet sent by the second device for the layer 2 gateway, the layer 2 gateway modifies the MAC addresses of the second packet, to enable a destination MAC address of the modified second packet to be the MAC address of the first device, and the layer 2 gateway sends the modified first packet to the first device. This implements cross-data center transmission of the second packet from the second device to the first device.

With reference to the first aspect, in a possible implementation, before the layer 2 gateway receives the second packet sent by the second device, the second device determines a MAC address corresponding to the private network address of the first device in the following manner. The layer 2 gateway receives a second ARP request packet sent by the second device, where the second ARP request packet is used to request the MAC address of the first device in the first subnet, and the layer 2 gateway sends a second ARP reply packet to the second device, where the second ARP reply packet carries the second MAC address of the layer 2 gateway.

The layer 2 gateway performs proxy reply to the second ARP request packet sent by the second device, so that the second device considers that the MAC address corresponding to the private network address of the first device is the second MAC address of the layer 2 gateway.

With reference to the first aspect, in a possible implementation, the second data center further includes a device manager connected to the second device. Before the layer 2 gateway receives the second packet sent by the second device, the second device needs to determine a MAC address corresponding to the private network address of the first device. The device manager receives a second ARP request packet sent by the second device, where the second ARP request packet is used to request the MAC address of the first device in the first subnet, and the device manager sends a second ARP reply packet to the second device, where the second ARP reply packet carries the second MAC address of the layer 2 gateway.

The device manager performs proxy reply to the second ARP request packet sent by the second device, so that the second device considers that the MAC address corresponding to the private network address of the first device is the second MAC address of the layer 2 gateway. The device manager connected to the second device intercepts the second ARP request packet sent by the second device, to minimize a quantity of times the second ARP request packet is broadcast in the second data center.

With reference to the first aspect, in a possible implementation, the device manager and the second device are disposed on a same compute node.

According to a second aspect, this application provides a management method in a hybrid cloud environment, where the hybrid cloud environment includes a first data center and a second data center, the first data center is configured to provide non-public cloud services, the second data center is configured to provide public cloud services, and a same private network segment is configured for a first subnet of the first data center and a second subnet of the second data center. The method includes the following steps: creating a layer 2 gateway, where the layer 2 gateway is located in the second data center, the layer 2 gateway is remotely connected to the first subnet of the first data center through a layer 2 communication tunnel, and the layer 2 gateway is connected to the second subnet of the second data center; and configuring an interception module on the layer 2 gateway, where the interception module is configured to intercept a first address resolution protocol ARP request packet from a first device in the first subnet for a second device in the second subnet, and return a first ARP reply packet to the first device, where the first ARP reply packet carries a first MAC address of the layer 2 gateway.

The layer 2 gateway is disposed in the second data center to intercept the first ARP request packet, to prevent the first ARP request packet from being broadcast in the second subnet of the second data center, ensure security of the second data center, prevent presence of a large quantity of broadcast packets from the first data center in the second data center, and avoid network load to the first data center caused by a broadcast packet generated by the second data center.

With reference to the second aspect, in a possible implementation, the method further includes the following step: configuring a learning module on the layer 2 gateway, where the learning module is configured to learn and record a correspondence, carried in the first ARP request packet, between an IP address of the first device and a MAC address of the first device.

After the first device obtains the first MAC address of the layer 2 gateway, when the first device accesses the second device through the layer 2 gateway, the layer 2 gateway modifies, based on the learned first correspondence, a destination MAC address of a packet sent by the first device from the first MAC address of the layer 2 gateway to a MAC address of the second device, so that the packet can arrive at the second device.

With reference to the second aspect, in a possible implementation, the method further includes the following step: configuring a reply module on the layer 2 gateway, where the reply module is configured to receive a second ARP request packet that is from the second device in the second subnet and that is for the first device, and return a second ARP reply packet to the second device, where the second ARP reply packet carries a second MAC address of the layer 2 gateway.

The layer 2 gateway is configured to perform proxy reply to the second ARP request packet sent by the second device, so that the second device considers that a MAC address corresponding to a private network address of the first device is the second MAC address of the layer 2 gateway, and perform non-malicious spoofing on the second device, so that the second device considers that the first device and the second device are located in a same local area network.

With reference to the second aspect, in a possible implementation, the method further includes the following step: configuring a device manager to receive a second ARP request packet that is from the second device and that is for the first device, and return a second ARP reply packet to the second device, where the second ARP reply packet carries a second MAC address of the layer 2 gateway, and the device manager is connected to the second device.

The device manager performs proxy reply to the second ARP request packet sent by the second device, so that the second device considers that the MAC address corresponding to the private network address of the first device is the second MAC address of the layer 2 gateway. The device manager connected to the second device intercepts the second ARP request packet sent by the second device, to minimize a quantity of times the second ARP request packet is broadcast in the second data center.

According to a third aspect, this application provides a layer 2 gateway in a hybrid cloud environment. The layer 2 gateway includes a functional module that can perform the communication method in the hybrid cloud environment according to any one of the first aspect or the possible implementations of the first aspect.

According to a fourth aspect, this application provides a management apparatus in a hybrid cloud environment. The management apparatus includes a functional module that can perform the management method in the hybrid cloud environment according to any one of the second aspect or the possible implementations of the second aspect.

According to a fifth aspect, this application provides a layer 2 gateway in a hybrid cloud environment. The layer 2 gateway includes a first network interface, a second network interface, a memory, and a processor. The memory stores a program instruction, and the processor runs the program instruction to perform the communication method performed by the layer 2 gateway in the hybrid cloud environment according to any one of the first aspect or the possible implementations of the first aspect.

According to a sixth aspect, this application provides a management apparatus in a hybrid cloud environment. The management apparatus includes a network interface, a memory, and a processor. The memory stores a program instruction, and the processor runs the program instruction to perform the management method in the hybrid cloud environment according to any one of the second aspect or the possible implementations of the second aspect.

According to a seventh aspect, this application provides a computer program product, including program code, where an instruction included in the program code is executed by a computer to perform the communication method in the hybrid cloud environment performed by the layer 2 gateway according to any one of the first aspect or the possible implementations of the first aspect.

According to an eighth aspect, this application provides a computer-readable storage medium, including an instruction. When a computer program instruction is run on a computer, the computer is enabled to perform the communication method in the hybrid cloud environment performed by the layer 2 gateway according to any one of the first aspect or the possible implementations of the first aspect.

According to a ninth aspect, this application provides a computer program product, including program code, where an instruction included in the program code is executed by a computer to perform the management method in the hybrid cloud environment according to any one of the second aspect or the possible implementations of the second aspect.

According to a tenth aspect, this application provides a computer-readable storage medium, including an instruction. When a computer program instruction is run on a computer, the computer is enabled to perform the management method in the hybrid cloud environment according to any one of the second aspect or the possible implementations of the second aspect.

According to an eleventh aspect, this application provides a communication configuration method in a hybrid cloud environment, where the hybrid cloud environment includes a first data center and a second data center, the first data center is configured to provide non-public cloud services, the second data center is configured to provide public cloud services, and a same private network segment is configured for a first subnet of the first data center and a second subnet of the second data center. The method includes: providing a configuration page, where the configuration page prompts a user to create a gateway in the second data center, and prompts the user to enter information about the first subnet to which the gateway needs to be connected, and local tunnel information and peer tunnel information of a communication tunnel to which the gateway needs to be connected; creating the gateway based on information about the configuration page; and after the gateway is successfully created, providing a prompt page, where the prompt page is used to prompt an address of a virtual tunnel end point VTEP device connected to the gateway.

With reference to the eleventh aspect, in a possible implementation, the local tunnel information includes information about a remote connection gateway of the second data center, and the peer tunnel information includes a tunnel identifier of the second subnet of the first data center and an address of a VTEP device connected to the second subnet.

For beneficial effects of the third aspect to the eleventh aspect of this application, refer to the descriptions of the beneficial effects of the first aspect and the second aspect and the possible implementations of the first aspect and the second aspect. Details are not described herein again.

BRIEF DESCRIPTION OF DRAWINGS

FIG. 8A to FIG. 8C are schematic diagrams of interaction interfaces provided by a control platform according to an embodiment of the present application;

FIG. 9A to FIG. 9D are a diagram of a packet flow for which a layer 2 gateway performs proxy reply to a physical machine according to an embodiment of the present application;

FIG. 10A to FIG. 10D are a diagram of a packet flow for which a physical machine actively sends a packet to a virtual machine according to an embodiment of the present application;

FIG. 11A to FIG. 11D are a diagram of a packet flow for which a virtual machine responds to a physical machine according to an embodiment of the present application;

FIG. 12A to FIG. 12D are a diagram of a packet flow for which a device manager performs proxy reply to a virtual machine according to an embodiment of the present application;

DESCRIPTION OF EMBODIMENTS

Figure 1:
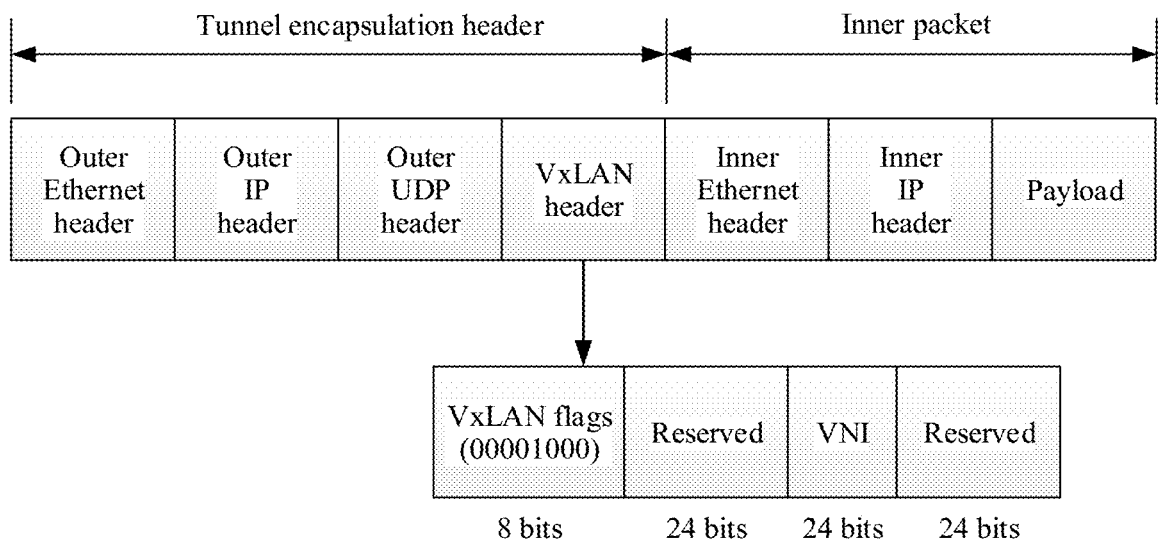
FIG. 1 is a diagram of a data format of a virtual extensible local area network (VXLAN) packet.

First, concepts related to the embodiments of the present application are explained as follows:

Public cloud services: Infrastructure as a service (IaaS) is a public cloud service, and provides infrastructure provided by a public cloud services provider as a service through internet. In this service model, users do not need to build a data center by themselves. Instead, they rent infrastructure such as a server, a storage device, and a network. The public cloud service is implemented by providing a virtual environment (such as a virtual machine). A core attribute of the public cloud service is that a plurality of users share cloud infrastructure and the users are isolated from each other.

Non-public cloud services: infrastructure dedicated to a single user, for example, a private cloud service and an on-premises service.

Private cloud service: A single user owns infrastructure such as a server, a storage device, and a network, and can fully control the infrastructure. The private cloud service is implemented by providing a virtual environment (such as a virtual machine). A core attribute of the private cloud service is that a single user exclusively uses the infrastructure.

On-premises service: A single user builds infrastructure such as a server, a storage device, and a network locally, and exclusively uses the infrastructure. The on-premises service is implemented by using a physical machine.

On-cloud data center: a data center that provides public cloud services.

On-premises data center: a data center that provides non-public cloud services. If the on-premises data center provides an on-premises service, the on-premises data center contains a plurality of physical machines. If the on-premises data center provides a private cloud service, the on-premises data center contains a plurality of virtual machines.

Public network address: A public network address is managed by an internet network information center (Internet NIC), and can be addressed on the internet.

Private network address: A private network address is an IP address that cannot be addressed on the internet but can only be addressed on a local area network. The private network address is forbidden on the internet.

A private network address is a reserved IP address segment. The following table shows classification, network segments, and quantities of private network addresses:

| Classification of private network addresses | Network segment | Quantity of available private network addresses |
|---|---|---|
| Class A private network address | 192.168.0.0/16 | 65,532 |
| Class B private network address | 172.16.0.0/12 | 1,048,572 |
| Class C private network address | 10.0.0.0/8 | 16,777,212 |

Virtual private cloud (VPC): A VPC is disposed in a public cloud, and is a local area network in an on-cloud data center of a user of a public cloud service.

The VPC isolates virtual networks. Each VPC has an independent tunnel number, and one tunnel number corresponds to one virtual network. Packets between virtual machines in one VPC have a same tunnel identifier correspondingly, and are sent to a physical network for transmission. Because tunnel identifiers of tunnels on which virtual machines in different VPCs are located are different, virtual machines in different VPCs are located on different routing planes. Therefore, the virtual machines in different VPCs cannot communicate with each other, and this naturally implements logical isolation.

The tunnel identifier may be, for example, a virtual local area network identifier (VLAN ID) or a virtual network identifier (VNI).

Media access control (MAC) address: A MAC address is an address used to determine a location of a network device. In an open system interconnection (OSI) seven layer model, a layer 3 network layer is for an IP address, and a layer 2 data link layer is for the MAC address. The MAC address is used to uniquely identify a network interface card on a network. If a device has one or more network interface cards, each network interface card requires and has a unique MAC address.

Data frame: A data frame is a protocol data unit at the layer 2 data link layer of the OSI seven layer model. The data frame includes an Ethernet header and a payload. The Ethernet header includes some necessary control information, for example, address information (a source MAC address and a destination MAC address), and the payload includes data transmitted from a network layer, for example, an IP packet. The IP header and a payload of the IP packet are both set in the payload of the data frame.

Layer 2 packet: A layer 2 packet is a data frame whose payload carries an IP packet. A quadruplet of the layer 2 packet includes a source IP address, a destination IP address, a source MAC address, and a destination MAC address. The source MAC address and the destination MAC address are set in an Ethernet header of the data frame, and the source IP address and the destination IP address are set in an IP packet header of the IP packet.

Address resolution protocol (ARP): As specified in an Ethernet protocol, if a host needs to directly communicate with another host on a same local area network, the host needs to know a MAC address of the target host. However, in a TCP/IP protocol, a network layer and a transport layer only concern an IP address of the target host. As a result, when the IP protocol is used in Ethernet, data provided by an upper-layer IP protocol connected to an Ethernet protocol of the data link layer includes only the IP address of the target host. Therefore, the MAC address of the target host needs to be obtained based on the IP address of the target host by using a method. This is what the ARP protocol does. Address resolution is a process in which a host translates a target IP address into a target MAC address. The host broadcasts an ARP request packet including the target IP address to all hosts on the local area network, and receives an ARP reply packet returned by the target host corresponding to the target IP address on the local area network. The ARP reply packet carries the MAC address of the target host, so that the host determines the MAC address of the target host. After receiving the ARP reply packet, the host stores the IP address and the MAC address in a local ARP entry for a period of time. When the host sends a request next time, the host queries the ARP entry to save resources. The ARP is an important communication protocol in the local area network.

VXLAN: A VXLAN is an overlay network technology. For details, refer to FIG. 1. FIG. 1 is a schematic diagram of a data format of a VXLAN packet. In the VXLAN packet, an inner packet is encapsulated into a payload of a user datagram protocol (UDP) packet. The payload of the UDP packet carries a VXLAN header, an inner Ethernet header, an inner IP header, and a payload of an IP packet as shown in FIG. 1. The inner packet of the VXLAN packet includes the inner Ethernet header, the inner IP header, and the payload of the IP packet. The inner Ethernet header records a source MAC address of the inner packet and a destination MAC address of the inner packet, and the inner IP header records a source IP address of the inner packet and a destination IP address of the inner packet.

The VXLAN packet further includes a tunnel encapsulation header. The tunnel encapsulation header includes an outer Ethernet header, an outer IP header, an outer UDP header, and the VXLAN header. The VXLAN header includes a VXLAN flags field (8 bits), a reserved field (24 bits), a VNI field (14 bits), and a reserved field (24 bits).

The outer Ethernet header records a source MAC address of a VXLAN tunnel end point (VTEP) and a destination MAC address of the VXLAN tunnel end point. The outer IP header records a source IP address of the VXLAN tunnel end point and a destination IP address of the VXLAN tunnel end point.

The VXLAN tunnel end point is referred to as a VTEP device in the following. The VTEP device is an endpoint of a VXLAN tunnel, and is configured to encapsulate the inner packet, that is, to add the outer Ethernet header, the outer IP header, an outer user datagram protocol header, and the VXLAN header to the inner packet, to generate the VXLAN packet. The VTEP device may further decapsulate the VXLAN packet, that is, to remove the outer Ethernet header, the outer IP header, the outer user datagram protocol header, and the VXLAN header from the VXLAN packet, to obtain the inner packet. In addition, during decapsulation, the VTEP device obtains the VNI from the VXLAN header, where the VNI is used to identify to a specific VPC to which the inner packet belongs.

During VXLAN encapsulation, the VTEP device uses a layer 2 packet as the inner packet of the VXLAN packet; records, in the outer Ethernet header of the tunnel encapsulation header of the VXLAN packet, a source MAC address as a MAC address of the VTEP device, and a destination MAC address as a MAC address of a next-hop device; records, in the outer IP header of the tunnel encapsulation header of the VXLAN packet, a source IP address as the IP address of the VTEP device, and a destination IP address as an IP address of a peer VTEP device; and records a VNI in the VNI field of the VXLAN header of the VXLAN packet. The foregoing next-hop device is a network device connected to the VTEP device, and the network device is a next-hop device in a routing path of the VXLAN packet from the VTEP device to the peer VTEP device of a tunnel based on the destination IP address recorded in the outer IP header.

An IP address of a VTEP device is referred to as a VTEP IP in the embodiments of the present application, and a MAC address of a VTEP device is referred to as a VTEP MAC in the embodiments of the present application.

Layer 2 communication tunnel: A layer 2 communication tunnel is a communication tunnel established by using an overlay network technology. A layer 2 packet is transmitted through the layer 2 communication tunnel as an inner packet of a VXLAN packet. During transmission, a source MAC address of the layer 2 packet and a destination MAC addresses of the layer 2 packet remain unchanged.

Figure 2:
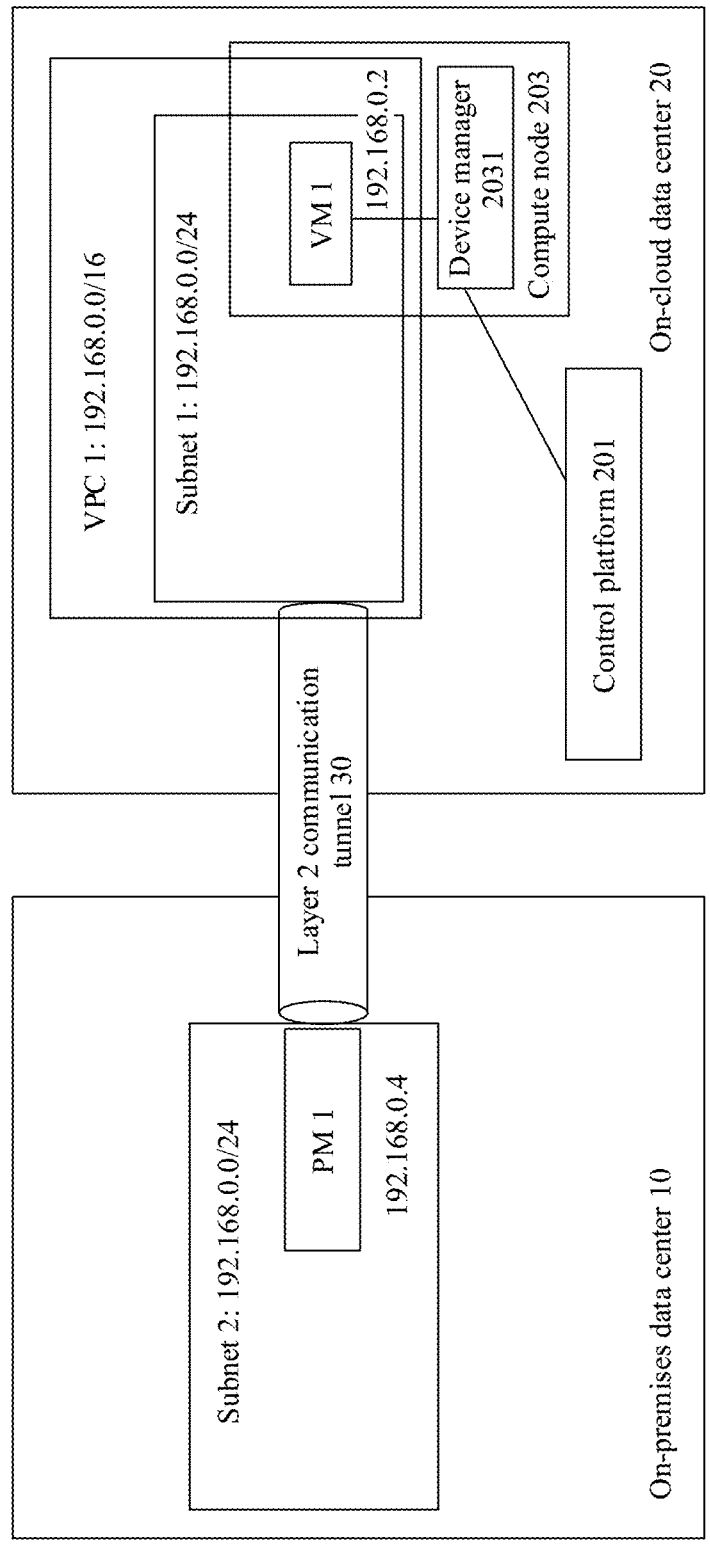
FIG. 2 is a schematic structural diagram of a hybrid cloud communications system.

FIG. 2 is a schematic structural diagram of a hybrid cloud communications system. As shown in FIG. 2, the hybrid cloud communications system includes an on-premises data center 10 and an on-cloud data center 20. The on-premises data center 10 and the on-cloud data center 20 are both connected to the internet (not shown in the figure). The on-premises data center 10 and the on-cloud data center 20 are located in different geographical locations.

The on-cloud data center 20 is used to provide a public cloud service. The on-cloud data center 20 is maintained by a public cloud services provider, and a user purchases and uses the public cloud services provided by the on-cloud data center 20.

A control platform 201 of the on-cloud data center 20 provides a user interaction interface, for example, a configuration page or an application programming interface (API). The user enters configuration information on the user interaction interface of the control platform 201, and the control platform 201 creates a VPC 1 dedicated to the user in the on-cloud data center 20 based on the configuration information, sets a subnet 1 (192.168.0.0/24) in the VPC 1 and creates a virtual machine VM 1 in the subnet 1. The VM 1 runs on a compute node 203 in the on-cloud data center 20.

A private network address of the VM 1 is 192.168.0.2, and the private network address belongs to a private network address segment of the subnet 1.

The control platform 201 is connected to a device manager 2031 of the compute node 203. The control platform 201 may control, based on the configuration information, the device manager 2031 to create the VM 1 on the compute node 203, and set the private network address of the VM 1 to 192.168.0.2.

The control platform 201 is configured to manage all devices in the on-premises data center 10, for example, assign and record private network addresses and MAC addresses of all virtual machines in a VPC, record a VTEP IP and a VTEP MAC of a VTEP device, and perform full life cycle management on the VMs in the VPC (such as creation, deletion, restarting, specification modification, network configuration modification, and storage configuration modification).

The control platform 201 is, for example, a software defined network (SDN) controller. The device manager 2031 is, for example, a virtual machine monitor (VMM) or a hypervisor.

In this embodiment, the on-premises data center 10 provides a local deployment service, the on-premises data center 10 includes a physical machine PM 1 disposed in a subnet 2 (192.168.0.0/24), and a private network address of the PM 1 is 192.168.0.4. The subnet 1 and the subnet 2 have a same private network address segment, and the private network address 192.168.0.4 of the PM 1 is different from the private network address 192.168.0.2 of the VM 1.

For example, the on-premises data center 10 may be a server cluster that is set up in an equipment room that is purchased or rented by the user, or may be a home communications system that is implemented by a user in a home environment by using a router and a personal computer.

Therefore, the user has management permission on all devices in the on-premises data center 10, and the user has management permission only on the VPC 1 in the on-cloud data center 20.

The management permission of the user on the VPC 1 is obtained by paying for the public cloud services provider.

The subnet 1 and the subnet 2 of the user belong to the same private IP address segment 192.168.0.0./24, but the PM 1 and the VM 1 have different private network addresses. If the user expects that the subnet 1 of the on-cloud data center 20 and the subnet 2 of the on-premises data center 10 can communicate with each other, and that the PM 1 and the VM 1 are disposed in a same subnet, a layer 2 communication tunnel 30 may be disposed between the subnet 1 and the subnet 2.

The on-premises data center 10 and the on-cloud data center 20 implement remote connection through the layer 2 communication tunnel 30. The layer 2 communication tunnel 30 may be implemented by using a remote connection gateway and a layer 2 tunnel gateway. The remote connection gateway is, for example, a virtual private network (VPN) gateway or a private line gateway. The layer 2 tunnel gateway may be implemented by using a large layer 2 technology, such as virtual extensible local area network (VXLAN) or generic routing encapsulation (GRE). A source MAC address and a destination MAC address of a layer 2 packet may remain unchanged when the layer 2 packet is transmitted through the layer 2 communication tunnel 30, and a specific principle thereof is described in detail in the following embodiments.

In this embodiment of the present application, when the PM 1 communicates with the VM 1 for the first time, the PM 1 records the private network address 192.168.0.2 of the VM 1 but does not record a MAC address of the VM 1. Therefore, the PM 1 needs to broadcast an ARP request packet in the subnet 2. A source MAC address of the ARP request packet is a MAC address of the PM 1, a source IP address of the ARP request packet is the private network address of the PM 1, a destination MAC address of the ARP request packet is FFFF FFFF FFFF (this is a broadcast address), and a destination IP address of the ARP request packet is the private network address of the VM 1. The ARP request packet is used to request the MAC address corresponding to the private network address 192.168.0.2 of the VM 1. The ARP request packet is broadcast in the subnet 2, is sent to the subnet 1 through the layer 2 communication tunnel 30, and is broadcast in the subnet 1.

However, in consideration of security, the control platform 201 forbids an ARP request packet from the on-premises data center 10 to be broadcast in the subnet 1, the VM 1 cannot receive the ARP request packet, and the PM 1 cannot obtain an ARP reply packet sent by the VM 1. As a result, the PM 1 cannot obtain the MAC address of the VM 1. Even if the subnet 1 and the subnet 2 are connected through the layer 2 communication tunnel 30, the PM 1 and the VM 1 are still layer 2 isolated.

Figure 3:
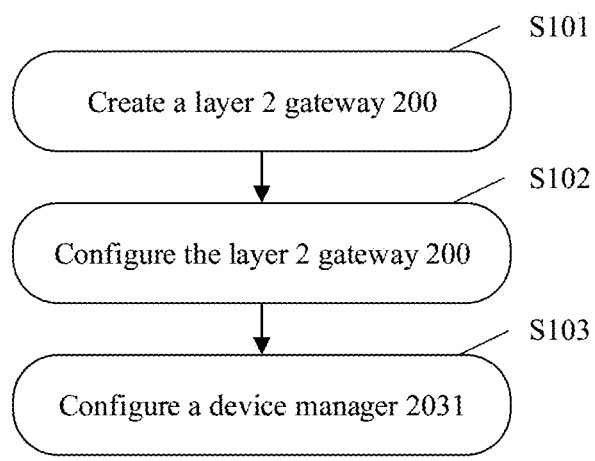
FIG. 3 is a flowchart of a configuration method in a hybrid cloud environment according to an embodiment of the present application.

In view of the foregoing technical problem, an embodiment of the present application provides a hybrid cloud environment management method. FIG. 3 is a flowchart of the hybrid cloud environment management method according to this embodiment of the present application. The method includes the following steps.

Step S101: Create a layer 2 gateway 200.

In this step, a control platform 201 creates the layer 2 gateway 200 in a subnet 1 based on configuration information, and the layer 2 gateway 200 includes a network interface card 1 and a network interface card 2. The network interface card 1 is set with a MAC address 1 of the layer 2 gateway 200, and the network interface card 2 is set with a MAC address 2 of the layer 2 gateway 200.

Step S102: Configure the layer 2 gateway 200.

In this step, the control platform 201 configures the network interface card 1 to access a layer 2 communication tunnel 30, so that the network interface card 1 is connected to a subnet 2, and configures the network interface card 2 to be connected to the subnet 1.

In addition, the control platform 201 configures the layer 2 gateway 200 to intercept an ARP request packet that is from a PM 1 in the subnet 2 and that is for a VM 1 in the subnet 1, and configures the layer 2 gateway 200 to return an ARP reply packet to the PM 1. The ARP reply packet carries the MAC address 1 of the network interface card 1 that is connected to the subnet 2 and that is of the layer 2 gateway 200.

In addition, the control platform 201 may further configure the layer 2 gateway 200 to perform MAC address translation on a layer 2 packet received from the network interface card 1. When determining that a destination IP address of the layer 2 packet is an IP address of the VM 1, the layer 2 gateway 200 obtains a MAC address of the VM 1 based on the IP address of the VM 1, modifies a destination MAC address of the layer 2 packet from the MAC address 1 to the MAC address of the VM 1, modifies a source MAC address from a MAC address of the PM 1 to the MAC address 2, and sends a translated packet to the subnet 1 by using the network interface card 2.

Further, the control platform 201 may configure the layer 2 gateway 200 to perform MAC address translation on the layer 2 packet received from the network interface card 2. When determining that the destination IP address of the layer 2 packet is an IP address of the PM 1, the layer 2 gateway 200 obtains the MAC address of the PM 1 based on the IP address of the PM 1, modifies the destination MAC address in the layer 2 packet from the MAC address 2 to the MAC address of the PM 1, modifies the source MAC address from the MAC address of the VM 1 to the MAC address 1, and sends a translated packet to the subnet 1 by using the network interface card 2.

Step S103: Configure a device manager 2031.

The control platform 201 configures the device manager 2031 to intercept an ARP request packet that is from the VM 1 and that is for the PM 1 in the subnet 2, and configures the device manager 2031 to return an ARP reply packet to the VM 1. The ARP reply packet carries the MAC address 2 of the network interface card 2 that is connected to the subnet 1 and that is of the layer 2 gateway 200.

Optionally, in another embodiment, the control platform 201 may further configure the layer 2 gateway 200 in the step 102 to intercept the ARP request packet that is from the VM 1 and that is for the PM 1 in the subnet 2, and configures the layer 2 gateway 200 to return an ARP reply packet to the VM 1. The ARP reply packet carries the MAC address 2 of the network interface card 2 that is connected to the subnet 1 and that is of the layer 2 gateway 200. In this embodiment, the layer 2 gateway 200 is used to intercept the ARP request packet sent by the VM 1, so that the device manager 2031 does not need to be configured to intercept the ARP request packet sent by the VM 1. Therefore, the step S103 may be omitted in this embodiment.

The device manager 2031 and the VM 1 are disposed on a same compute node 203, and the device manager 2031 is configured to intercept the ARP request packet sent by the VM 1, so that the ARP request packet may be limited within the compute node 203, and the network load of an on-cloud data center 20 can be reduced.

Figure 4:
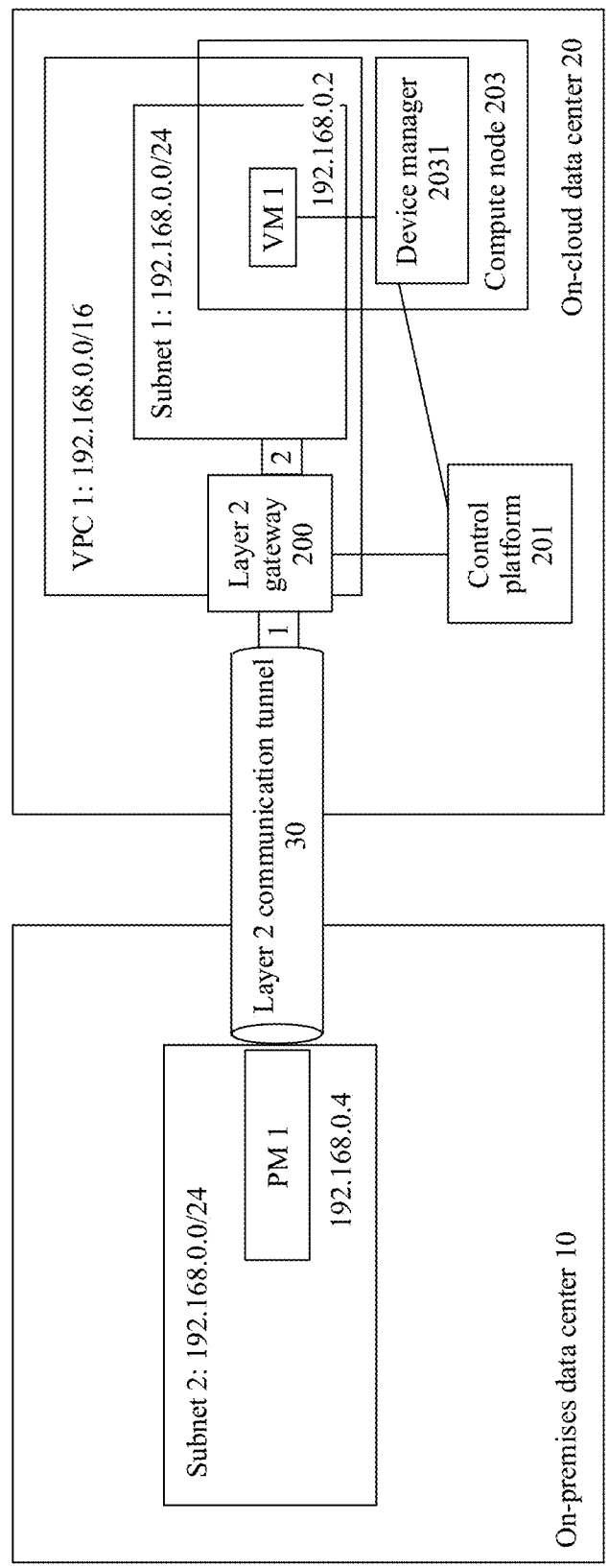
FIG. 4 is a schematic structural diagram of a hybrid cloud environment according to an embodiment of the present application.

After the foregoing configuration, the hybrid cloud environment may be updated, as shown in FIG. 4. FIG. 4 is a schematic structural diagram of the hybrid cloud environment according to this embodiment of the present application. As shown in the figure, compared with the foregoing embodiment, the layer 2 gateway 200 is further configured in this embodiment, the network interface card 1 of the layer 2 gateway 200 is connected to the layer 2 communication tunnel 30, so as to be connected to the subnet 2, and the network interface card 2 is connected to the subnet 1.

Figure 5:
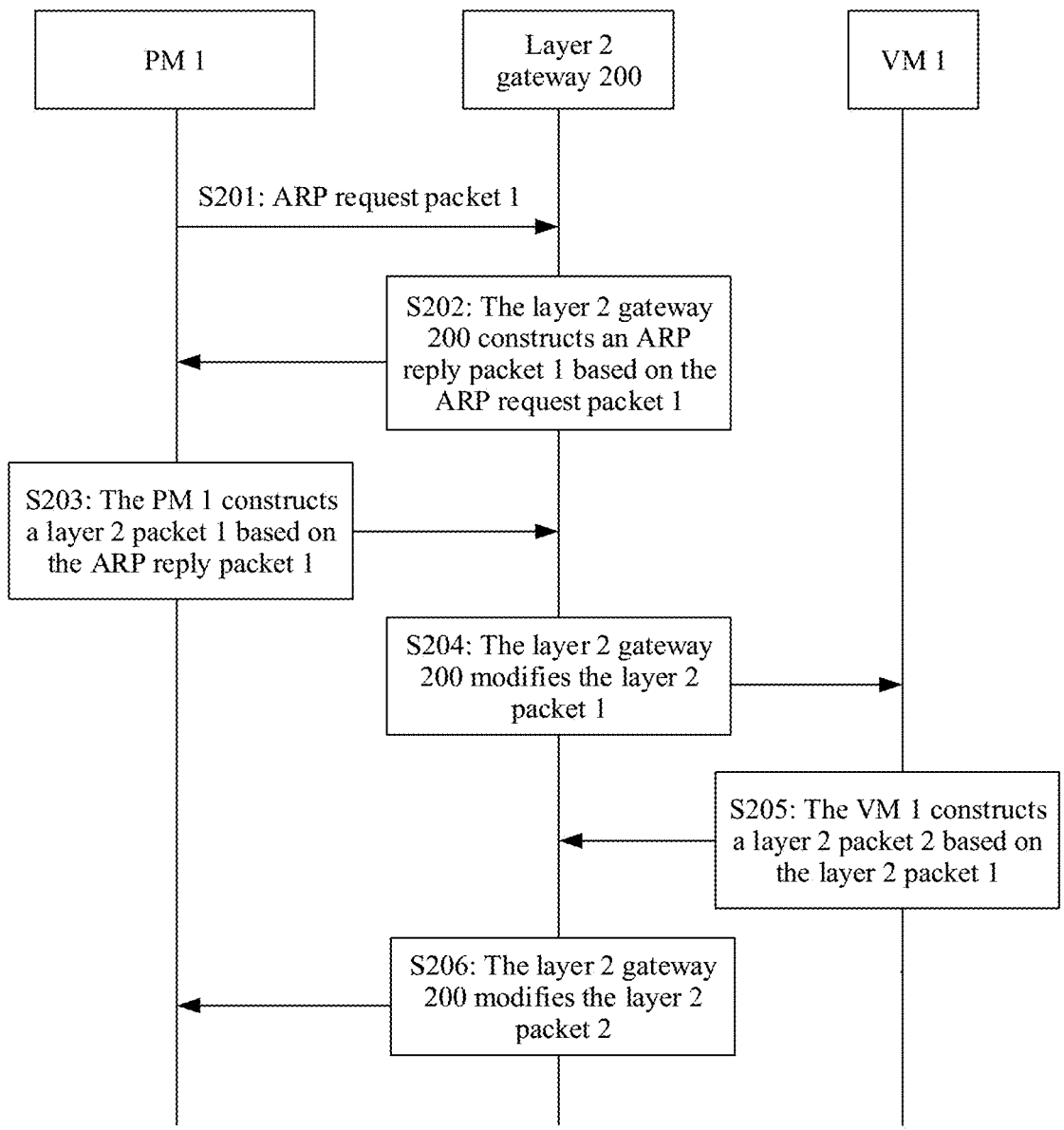
FIG. 5 is a data interaction diagram of a communication method in a hybrid cloud environment according to an embodiment of the present application.

With reference to FIG. 5, the following describes a communication process between the subnet 1 and the subnet 2 based on the hybrid cloud environment shown in FIG. 4.

FIG. 5 is a data interaction diagram of a communication method in a hybrid cloud environment according to an embodiment of the present application. In this embodiment, a PM 1 actively communicates with a VM 1. In a TCP/IP protocol, because a network layer and a transport layer only concern an IP address of a target host, when the PM 1 communicates with the VM 1 for the first time, the PM 1 records a private network address 192.168.0.2 of the VM 1, but a local ARP entry of the PM 1 does not record a MAC address corresponding to the private network address 192.168.0.2 of the VM 1.

For ease of description, the following records the MAC address of the PM 1 as a PM 1 MAC, records a MAC address of the VM 1 as a VM 1 MAC, records a MAC address 1 of the layer 2 gateway 200 as an L2 MAC 1, and records a MAC address 2 of a layer 2 gateway 200 as an L2 MAC 2.

A hybrid cloud communication method in this embodiment of the present application includes the following steps.

Step S201: The PM 1 broadcasts an ARP request packet 1 in a subnet 2, where the ARP request packet 1 is sent to the layer 2 gateway 200 through a layer 2 communication tunnel.

In this step, the PM 1 actively communicates with the VM 1. In this case, the PM 1 records the private network address 192.168.0.2 of the VM 1, but does not record the MAC address corresponding to the private network address of the VM 1. Before the PM 1 performs layer 2 communication with the VM 1, the PM 1 needs to obtain the MAC address corresponding to the private network address of the VM 1. Therefore, the PM 1 broadcasts the ARP request packet 1 in the subnet 2. A source IP address of the ARP request packet 1 is a private network address 192.168.0.4 of the PM 1, a source MAC address of the ARP request packet 1 is the PM 1 MAC, a destination IP address of the ARP request packet 1 is the private network address 192.168.0.2 of the VM 1, and a destination MAC address of the ARP request packet 1 is FFFF FFFF FFFF. The ARP request packet 1 is used to request the MAC address of the VM 1.

The ARP request packet 1 is sent to a network interface card 1 of the layer 2 gateway 200 through a layer 2 communication tunnel 30.

It should be noted that the ARP request packet 1 arrives at the network interface card 1 of the layer 2 gateway 200 through the layer 2 communication tunnel 30. In this process, the source MAC address, the destination MAC address, the source IP address, and the destination IP address of the ARP request packet 1 remain unchanged. A specific principle is described in detail in the following.

Step S202: The layer 2 gateway 200 constructs an ARP reply packet 1 based on the ARP request packet 1, and sends the ARP reply packet 1 to the PM 1.

The layer 2 gateway 200 obtains the ARP request packet 1 from the network interface card 1, and determines, based on the destination MAC address (FFFF FFFF FFFF) of the ARP request packet 1, that the ARP request packet 1 is a broadcast packet. The layer 2 gateway 200 intercepts the ARP request packet 1, and constructs the ARP reply packet 1.

A source IP address of the ARP reply packet 1 is the private network address 192.168.0.2 of the VM 1, a source MAC address the ARP reply packet 1 is the L2 MAC 1, a destination IP address the ARP reply packet 1 is the private network address 192.168.0.4 of the PM 1, and a destination MAC address the ARP reply packet 1 is the PM 1 MAC. The ARP reply packet 2 is used to notify the PM 1 that a MAC address corresponding to 192.168.0.2 is the L2 MAC 1.

The layer 2 gateway 200 sends the ARP reply packet 1 to the layer 2 communication tunnel 30 by using the network interface card 1, and the ARP reply packet 1 is transmitted to the PM 1 in the subnet 2 through the layer 2 communication tunnel 30.

In addition, in this step, the layer 2 gateway 200 learns and records a correspondence between the source MAC address (the PM 1 MAC) and the source IP address (192.168.0.4) of the ARP request packet 1.

For example, the layer 2 gateway 200 may record the correspondence between the PM 1 MAC and 192.168.0.4 in a local ARP entry of the layer 2 gateway 200.

Step S203: The PM 1 constructs a layer 2 packet 1 based on the ARP reply packet 1, and sends the layer 2 packet 1 to the layer 2 gateway 200.

The PM 1 constructs the layer 2 packet 1 based on the ARP reply packet 1 and sends the layer 2 packet 1 to the network interface card 1 of the layer 2 gateway 200 through the layer 2 communication tunnel 30.

The PM 1 learns the L2 MAC 1 from the source MAC address of the ARP reply packet 1. The PM 1 constructs the layer 2 packet 1 based on the learned L2 MAC 1 address. A source IP address of layer 2 packet 1 is the private network address 192.168.0.4 of the PM 1, and a source MAC address of layer 2 packet 1 is the PM 1 MAC, a destination IP address of layer 2 packet 1 is the private network address 192.168.0.2 of the VM 1, and a destination MAC address of layer 2 packet 1 is the L2 MAC 1 (namely, the MAC address of the network interface card 1). A payload of the layer 2 packet 1 carries an IP packet 1, and a payload of the IP packet 1 carries request information 1. The request information 1 is used to request a reply from the VM 1. An IP header of the IP packet 1 carries the destination IP address and the source IP address.

In this step, the PM 1 may record a correspondence between 192.168.0.2 and the L2 MAC 1 in the local ARP entry, and subsequently, when the PM 1 communicates with 192.168.0.2, the PM 1 only needs to determine the L2 MAC 1 by querying the local ARP entry, and does not need to send an ARP request packet again to learn the MAC address.

Step S204: The layer 2 gateway 200 modifies the layer 2 packet 1, and sends a modified layer 2 packet 1 to the VM 1.

In this step, the layer 2 gateway 200 determines the MAC address of the VM 1 (VM 1 MAC) based on the destination IP address 192.168.0.2 of the layer 2 packet 1, modifies the destination MAC address of the layer 2 packet 1 from the L2 MAC 1 to the VM 1 MAC, and modifies the source MAC address from the PM 1 MAC to the L2 MAC 2.

It should be noted that the control platform 201 may send a correspondence between 192.168.0.2 and the VM 1 MAC to the layer 2 gateway 200 in advance, and the layer 2 gateway 200 records the correspondence between 192.168.0.2 and the VM 1 MAC in the local ARP entry.

For example, when creating the layer 2 gateway 200, the control platform 201 may preset the correspondence between 192.168.0.2 and the VM 1 MAC in the layer 2 gateway 200.

The layer 2 gateway 200 sends the modified layer 2 packet 1 to the VM 1 in the subnet 1 by using the network interface card 2 connected to the subnet 1.

Step S205: The VM 1 constructs a layer 2 packet 2 based on the layer 2 packet 1, and sends a modified layer 2 packet 2 to the layer 2 gateway 200.

In this step, the layer 2 packet 2 is a reply packet of the layer 2 packet 1.

As described above, the payload of the layer 2 packet 1 carries the IP packet 1, and the payload of the IP packet 1 carries the request information 1. The VM 1 generates reply information 1 based on the request information 1, and constructs the layer 2 packet 2. A payload of the layer 2 packet 2 carries an IP packet 2, and a payload of the IP packet 2 carries the reply information 1. A source MAC address of the layer 2 packet 2 is the VM 1 MAC, a destination MAC address of the layer 2 packet 2 is the L2 MAC 2, a source IP address of the layer 2 packet 2 is the private network address 192.168.0.2 of the VM 1, and a destination IP address of the layer 2 packet 2 is the private IP address 192.168.0.4 of the PM 1. The VM 1 sends the modified layer 2 packet 2 to the network interface card 2 of the layer 2 gateway 200.

Further, after receiving the layer 2 packet 1, the VM 1 may record a correspondence between the source IP address (192.168.0.4) of the layer 2 packet 1 and the source MAC address (the L2 MAC 2) of the layer 2 packet in a local ARP entry.

When the VM 1 communicates with 192.168.0.4, the VM 1 only needs to determine the L2 MAC 2 by querying the local ARP entry, and does not need to send the ARP request packet to learn the MAC address.

Step S206: The layer 2 gateway 200 modifies the layer 2 packet 2, and sends the modified layer 2 packet 2 to the PM 1.

In this step, the layer 2 gateway 200 queries the local ARP entry based on the destination IP address (192.168.0.4) of the layer 2 packet 2, to determine the PM 1 MAC, modify the destination MAC address of the layer 2 packet 2 to the PM 1 MAC, and modify the source MAC address to the L2 MAC 1.

In the foregoing step S202, the layer 2 gateway 200 has learned and recorded the correspondence between 192.168.0.4 and the PM 1 MAC, and the correspondence is recorded in the local ARP entry of the layer 2 gateway 200.

After modifying the layer 2 packet 2, the layer 2 gateway 200 sends the modified layer 2 packet 2 to the PM 1 by using the network interface card 1.

Because the network interface card 1 is connected to the layer 2 communication tunnel 30, the layer 2 packet 2 is sent from the network interface card 1, and arrives at the PM 1 in the subnet 2 through the layer 2 communication tunnel 30.

The PM 1 receives the layer 2 packet 2, and obtains the reply information 1 of the VM 1 from the layer 2 packet 2. The communication between the PM 1 and the VM 1 is completed.

The PM 1 does not need to send the ARP request packet for subsequent communication with the VM 1. Instead, the PM 1 only needs to construct, based on the local ARP entry, a layer 2 packet whose destination IP address is 192.168.0.2 and whose destination MAC address is the L2 MAC 1, and the layer 2 packet arrives at the VM 1 through the layer 2 communication tunnel 30 and the layer 2 gateway 200.

When the VM 1 replies, the layer 2 packet whose destination IP address is 192.168.0.2 and whose destination MAC address is the L2 MAC 1 is constructed, and the layer 2 packet may arrive at the PM 1 through the layer 2 gateway 200 and the layer 2 communication tunnel 30.

It should be noted that, for brevity, the device manager 2031 is omitted in FIG. 5. In step S204, the modified layer 2 packet 1 is forwarded to the VM 1 by using the device manager 2031. In addition, the layer 2 packet 2 in step S205 is forwarded to the layer 2 gateway 200 by using the device manager 2031.

Figure 6:
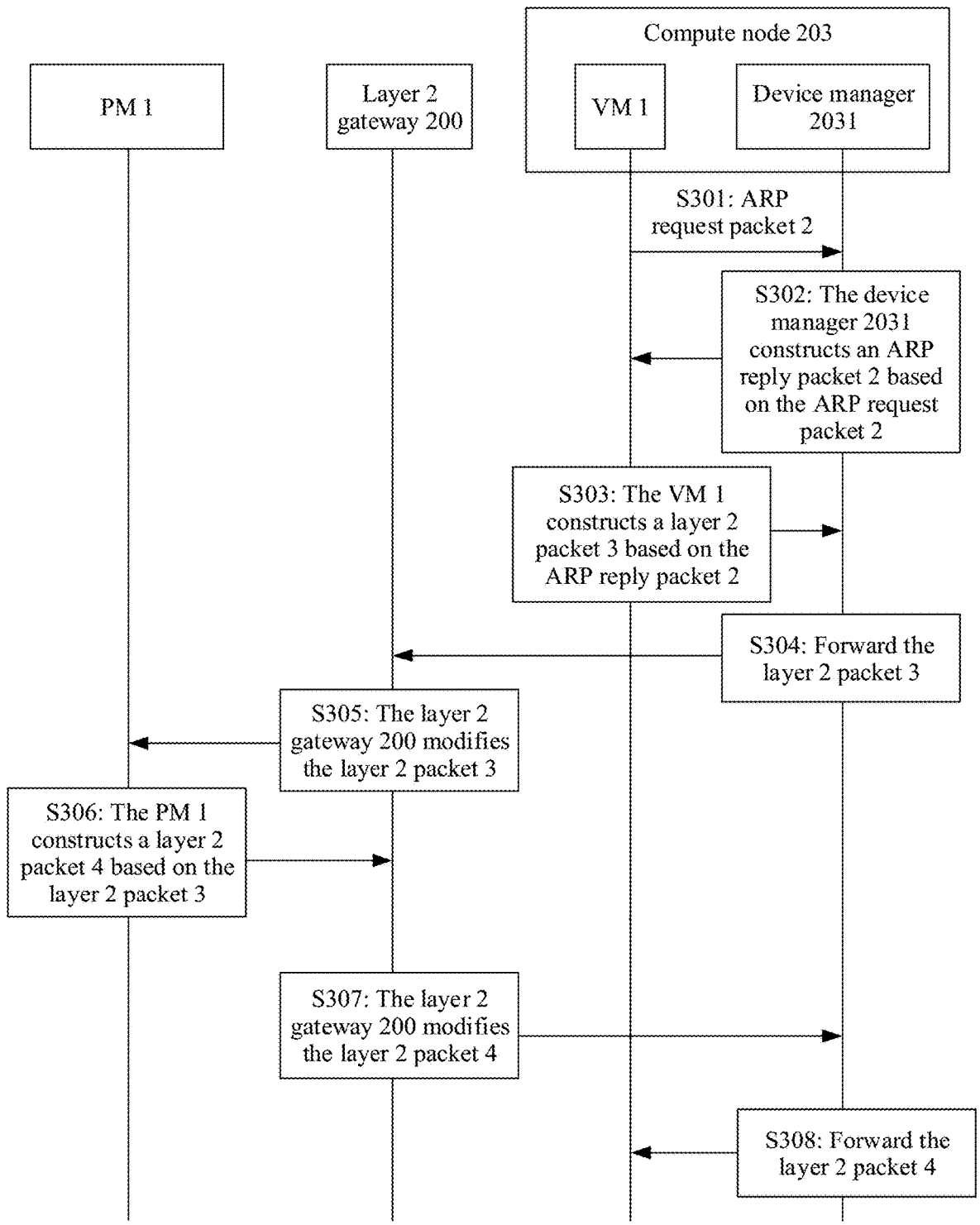
FIG. 6 is another data interaction diagram of a communication method in a hybrid cloud environment according to an embodiment of the present application.

FIG. 6 is another data interaction diagram of a communication method in a hybrid cloud environment according to an embodiment of the present application. Different from FIG. 5, in this embodiment shown in FIG. 6, when a VM 1 communicates with a PM 1 for the first time, a local ARP entry of the VM 1 does not record a MAC address corresponding to a private network address (192.168.0.4) of the PM 1, and the VM 1 needs to send an ARP request packet to obtain the MAC address corresponding to 192.168.0.4.

As shown in FIG. 6, the hybrid cloud communication method according to this embodiment of the present application includes the following steps.

Step 301: The VM 1 sends an ARP request packet 2 to a device manager 2031.

Because the VM 1 actively communicates with the PM 1, the local ARP entry of the VM 1 does not record the MAC address corresponding to the private network address (192.168.0.4) of the PM 1. Therefore, before actively sending a layer 2 packet to the PM 1, the VM 1 needs to obtain the MAC address corresponding to 192.168.0.4.

Therefore, the VM 1 needs to broadcast the ARP request packet 2 in a subnet 1. A source IP address of the ARP request packet 2 is 192.168.0.2, a source MAC address of the ARP request packet 2 is a VM 1 MAC, a destination IP address of the ARP request packet 2 is 192.168.0.2, and a destination MAC address of the ARP request packet 2 is FFFF FFFF FFFF. The ARP request packet 2 is used to request a MAC address corresponding to 192.168.0.2.

As shown in FIG. 4, the VM 1 and the device manager 2031 are both disposed on the compute node 203, the device manager 2031 is configured to manage the VM 1, and the ARP request packet 2 that is sent by the VM 1 to the subnet 1 for broadcasting first arrives at the device manager 2031.

Step 302: The device manager 2031 constructs an ARP reply packet 2 based on the ARP request packet 2, and sends the ARP reply packet 2 to the VM 1.

The device manager 2031 first determines, based on the destination MAC address (FFFF FFFF FFFF) of the ARP request packet 2, that the ARP request packet 2 is a broadcast packet, and determines, based on the destination IP address (the private network address 192.168.0.4 of the PM 1) of the ARP request packet 2, that the ARP request packet 2 is not for a device in the subnet 1. In this case, the device manager 2031 needs to intercept the ARP request packet 2, and therefore constructs the ARP reply packet 2.

The control platform 201 sends private network addresses of all virtual machines in the subnet 1 to the device manager 2031 in advance. In this embodiment, only the VM 1 is disposed in the subnet 1, and the private network address of the VM 1 is 192.168.0.2.

The device manager 2031 receives and records the private network address of the VM 1 in the subnet 1, and after receiving the ARP request packet 2 sent by the VM 1, determines whether the destination IP address (192.168.0.4) of the ARP request packet 2 belongs to the recorded private network addresses of all virtual machines in the subnet 1. If the destination IP address of the ARP request packet 2 belongs to the recorded private network addresses of all the virtual machines in the subnet 1, it indicates that the ARP request packet 2 is for a virtual machine in the subnet 1, and the device manager 2031 sends the ARP request packet 2 to the subnet 1 for broadcasting. If the destination IP address of the ARP request packet 2 does not belong to the recorded private network addresses of all the virtual machines in the subnet 1, it indicates that the ARP request packet 2 is not for a device in the subnet 1 (namely, a physical machine in the subnet 2), and the device manager 2031 intercepts the ARP request packet 2, and constructs the ARP reply packet 2. A source MAC address of the ARP reply packet 2 is a L2 MAC 2, a source IP address of the ARP reply packet 2 is the private network address 192.168.0.4 of the PM 1, a destination MAC address of the ARP reply packet 2 is the VM 1 MAC, and a destination IP address of the ARP reply packet 2 is the private network address 192.168.0.2 of the VM 1.

The control platform 201 may send the L2 MAC 2 to the device manager 2031 in advance, and the device manager 2031 receives and records the L2 MAC 2.

In this embodiment, the device manager 2031 determines that the destination IP address (192.168.0.4) of the ARP request packet 2 does not belong to the private network addresses (192.168.0.2) of all the virtual machines in the subnet 1. Therefore, the device manager 2031 constructs the ARP reply packet 2, and sends the ARP reply packet 2 to the VM 1.

The ARP reply packet 2 is used to notify the VM 1 that the MAC address corresponding to 192.168.0.4 is the L2 MAC 2.

Step 303: The VM 1 constructs a layer 2 packet 3 based on the ARP reply packet 2, and sends the layer 2 packet 3 to the device manager 2031.

After receiving the ARP reply packet 2, the VM 1 learns the L2 MAC 2 based on the source MAC address of the ARP reply packet 2, and constructs the layer 2 packet 3 based on the L2 MAC 2. A payload of the layer 2 packet 3 carries an IP packet 3. A payload of the IP packet 3 carries request information 2, and the request information 2 is used to request a reply from the PM 1. A source MAC address of the layer 2 packet 3 is the VM 1 MAC, a source IP address of the layer 2 packet 3 is 192.168.0.2, a destination IP address of the layer 2 packet 3 is 192.168.0.4, and a destination MAC address of the layer 2 packet 3 is the L2 MAC 2.

The VM 1 sends the layer 2 packet 3 to the network interface card of the layer 2 gateway 200.

Step 304: The device manager 2031 forwards the layer 2 packet 3 to the layer 2 gateway 200 based on the destination MAC address of the layer 2 packet 3.

The device manager 2031 forwards the layer 2 packet 3 to the network interface card 2 of the layer 2 gateway 200.

Step 305: The layer 2 gateway 200 modifies the layer 2 packet 3, and sends a modified layer 2 packet 3 to the PM 1.

The network interface card 2 of the layer 2 gateway 200 receives the layer 2 packet 3, and determines, based on the destination IP address (192.168.0.4) of the layer 2 packet 3, whether the MAC address corresponding to 192.168.0.4 is recorded in a local ARP entry. When the PM 1 has sent the ARP request packet to the layer 2 gateway 200 (referring to step 202), a correspondence between 192.168.0.4 and the PM 1 MAC is recorded in the local ARP entry of the layer 2 gateway 200.

The layer 2 gateway 200 may obtain the PM 1 MAC from the local ARP entry based on 192.168.0.4.

When the PM 1 has not sent any ARP request packet to the layer 2 gateway 200, the local ARP entry of the layer 2 gateway 200 does not record the MAC address corresponding to 192.168.0.4. In this case, the layer 2 gateway 200 may actively send an ARP request packet to the subnet 2 by using the network interface card 1 connected to the subnet 2, to learn the MAC address of the PM 1.

A source MAC address of the ARP request packet is the L2 MAC 1, a source IP address of the ARP request packet is 192.168.0.2, a destination IP address of the ARP request packet is 192.168.0.4, and a destination MAC address of the ARP request packet is FFFF FFFF FFFF. The ARP request packet is used to request the MAC address corresponding to 192.168.0.4 in the subnet 2, and the ARP request packet is broadcast in the subnet 2 through the layer 2 communication tunnel 30.

The PM 1 receives the ARP request packet and constructs an ARP reply packet based on the destination IP address (192.168.0.4) of the ARP request packet. A source MAC address of the ARP reply packet is the PM 1 MAC, a destination MAC address of the ARP reply packet is the L2 MAC 1, a source IP address of the ARP reply packet is 192.168.0.4 of the PM 1, and the destination IP address of the ARP reply packet is 192.168.0.2.

The PM 1 sends the ARP reply packet to the network interface card 1 of the layer 2 gateway 200 through the layer 2 communication tunnel 30. The layer 2 gateway 200 learns the PM 1 MAC from the source MAC address of the ARP reply packet, and records the correspondence between the PM 1 MAC and 192.168.0.4 in the local ARP entry.

After obtaining the PM 1 MAC, the layer 2 gateway 200 modifies the destination MAC address of the layer 2 packet 3 from the L2 MAC 2 to the PM 1 MAC, and modifies the source MAC address from the VM 1 MAC to the L2 MAC 1. The layer 2 gateway 200 sends the layer 2 packet 3 to the layer 2 communication tunnel 30 by using the network interface card 1, and the layer 2 packet 2 is sent to the PM 1 in the subnet 2 through the layer 2 communication tunnel 30.

In conclusion, when the local ARP entry records the L2 MAC 1, the layer 2 gateway 200 directly modifies the layer 2 packet 2 based on the L2 MAC 1; and when the local ARP entry does not record the L2 MAC 1, the layer 2 gateway 200 may actively send the ARP request packet to the subnet 2 to learn the L2 MAC 1.

Step 306: The PM 1 constructs a layer 2 packet 4 based on the layer 2 packet 3, and sends the layer 2 packet 4 to the layer 2 gateway 200.

After receiving the layer 2 packet 3, the PM 1 obtains the IP packet 3 from the payload of the layer 2 packet 3, and obtains the request information 2 from the payload of the IP packet 3. The PM 1 generates reply information 2 based on the request information 2, and constructs the layer 2 packet 4. A payload of the layer 2 packet 4 carries an IP packet 4, and a payload of the IP packet 4 carries the reply information 2. The source MAC address of the layer 2 packet 4 is the PM 1 MAC, the destination MAC address of the layer 2 packet 4 is the L2 MAC 1, the source IP address of the layer 2 packet 4 is 192.168.0.4, and the destination IP address of the layer 2 packet 4 is 192.168.0.2.

In addition, the PM 1 may record the source MAC address (the L2 MAC 1) and the source IP address (192.168.0.2) of the layer 2 packet 2 in the local ARP entry.

The PM 1 sends the layer 2 packet 4 to the network interface card 1 of the layer 2 gateway 200 through the layer 2 communication tunnel 30.

Step 307: The layer 2 gateway 200 modifies the layer 2 packet 4, and sends a modified layer 2 packet 4 to the device manager 2031 by using the network interface card 2.

The layer 2 gateway 200 queries the local ARP entry based on the destination IP address (192.168.0.2) of the layer 2 packet 4 to determine the VM 1 MAC, modify the destination MAC address of the layer 2 packet 4 from the L2 MAC 1 to the VM 1 MAC, and modify the source MAC address from the PM 1 MAC to the L2 MAC 2.

It should be noted that the control platform 201 may send the correspondence between 192.168.0.2 and the VM 1 MAC to the layer 2 gateway 200 in advance, and the layer 2 gateway 200 records the correspondence between 192.168.0.2 and the VM 1 MAC in the local ARP entry.

Step 308: The device manager 2031 forwards the modified layer 2 packet 4 to the VM 1.

In this step, after receiving the layer 2 packet 4, the VM 1 obtains the IP packet 4 from the payload of the layer 2 packet 4, and obtains the reply information 2 from the payload of the IP packet 4.

The VM 1 obtains the reply information 2 generated by the PM 1 and does not need to send the ARP request packet for subsequent communication from the VM 1 to the PM 1. The VM 1 only needs to construct a layer 2 packet whose destination MAC address is the L2 MAC 2 and whose destination IP address is 192.168.0.2, and the VM 1 can perform the layer 2 communication with the PM 1 through the layer 2 gateway 200 and the layer 2 communication tunnel 30.

In conclusion, the layer 2 gateway 200 is connected to both the subnet 1 and the subnet 2 that have a same private network address segment, performs proxy reply to an ARP request packet, and performs MAC translation on a layer 2 packet. Therefore, from a perspective of the PM 1 and the VM 1, the subnet 1 and the subnet 2 belong to a same broadcast domain, and the VM 1 on a cloud and the PM 1 off the cloud implement layer 2 communication through the layer 2 gateway 200.

It should be noted that, in the foregoing embodiment, the device manager 2031 intercepts the ARP request packet 2 sent by the VM 1, and directly sends the ARP reply packet 2 to the VM 1, to notify the VM 1 that the MAC address corresponding to 192.168.0.4 is the L2 MAC 2. However, in some other examples of the present application, the device manager 2031 may alternatively not intercept the ARP request packet 2 sent by the VM 1, but forward the ARP request packet 2 to the subnet 1 for broadcasting, so that the layer 2 gateway 200 that is connected to the subnet 1 by using the network interface card 2 may receive the ARP request packet 2 from the subnet 1, and generates the ARP reply packet based on the ARP request packet 2. The layer 2 gateway 200 sends the ARP reply packet to the VM 1 in the subnet 1 by using the network interface card 2, to notify the VM 1 that the MAC address corresponding to 192.168.0.4 is the L2 MAC 2.

This embodiment of the present application may support the layer 2 communication between the subnet 2 of the on-premises data center 10 and the subnet 1 of the on-cloud data center 20, where the on-premises data center 10 and the on-cloud data center 20 have the same private network address segment, and this is favorable for a scenario of switching from a hybrid cloud to a public cloud.

Switching from the hybrid cloud to the public cloud is to migrate an image of a device in the subnet 2 of the on-premises data center 10 to a virtual machine in the subnet 1 of the on-cloud data center 20, and disable the device in the subnet 2 after the migration succeeds.

For example, when the PM 1 needs to be migrated to the subnet 1 of the on-cloud data center 20, a user may create a VM 3 in the subnet 1, import an image of the PM 1 to the VM 3, and shut down the PM 1. The VM 3 is an image of the PM 1, and therefore a private network address 192.168.0.4 and a MAC address PM 1 MAC of the VM 3 are the same as those of the PM 1. When the VM 3 needs to actively communicate with the VM 1, an ARP request packet for 192.168.0.2 is broadcast in the subnet 1, the VM 3 may obtain an ARP reply packet that carries the VM 1 MAC returned by the VM 1. The VM 3 may implement layer 2 communication with the VM 1 in the subnet 1 based on the VM 1 MAC.

According to a same principle, all devices in the subnet 2 may be migrated to the subnet 1 in a similar manner. After the devices in the subnet 2 are migrated to the subnet 1, private network addresses and MAC addresses of the devices are the same as those before the migration. Therefore, the private network addresses and the MAC addresses of the devices in the subnet 2 do not need to be modified, and a network model of the subnet 2 may be completely migrated to the subnet 1. This greatly facilitates migration of devices in an on-premises data center to the public cloud.

Therefore, a layer 2 gateway is used to implement the layer 2 communication between the subnet 1 and the subnet 2. In the scenario of switching from the hybrid cloud to the public cloud, a network model of the on-cloud data center can be completely retained in the public cloud.

Figure 7A:
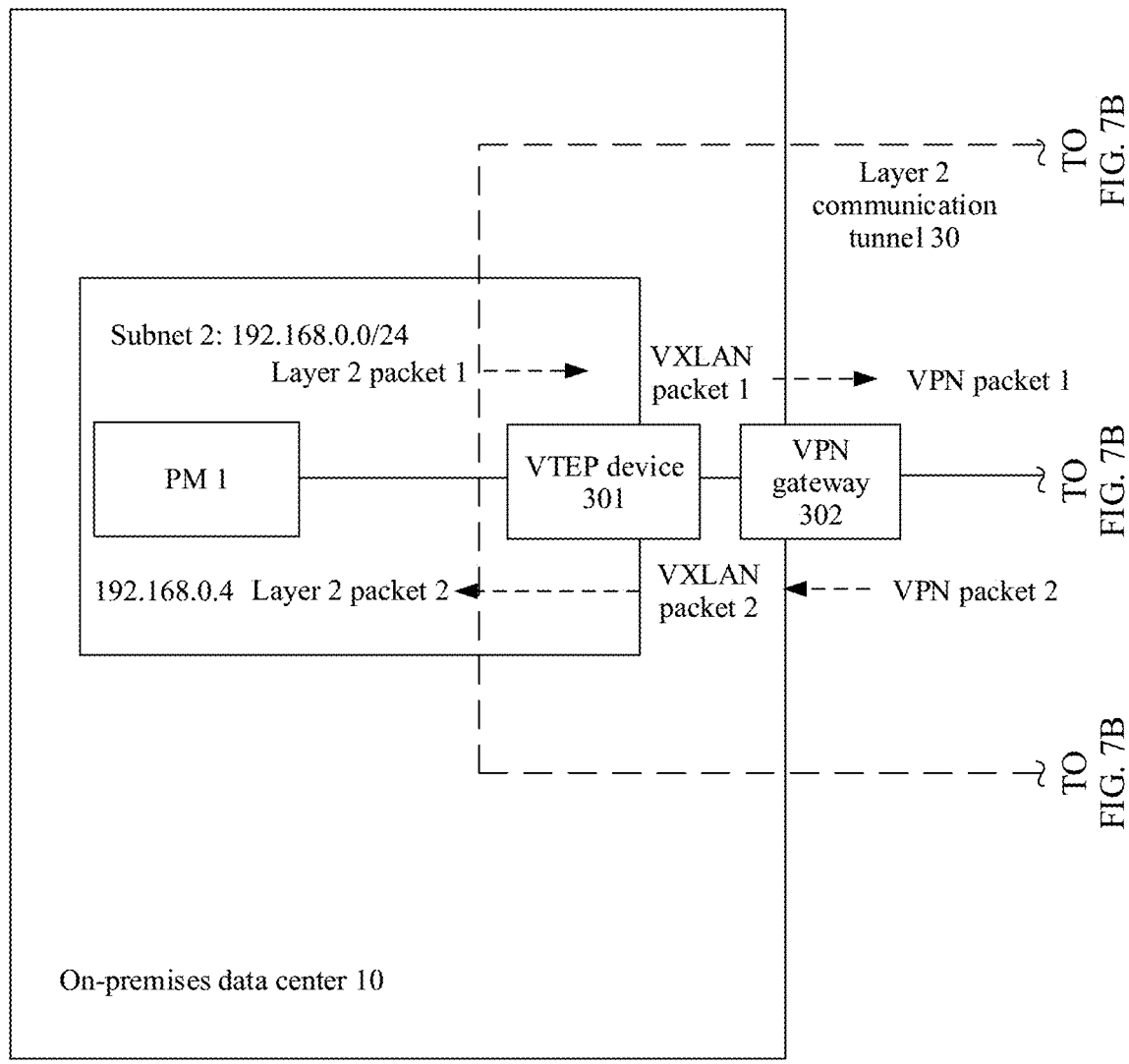
FIG. 7A and FIG. 7B are another schematic structural diagram of a system of a hybrid cloud environment according to an embodiment of the present application.
Figure 7B:
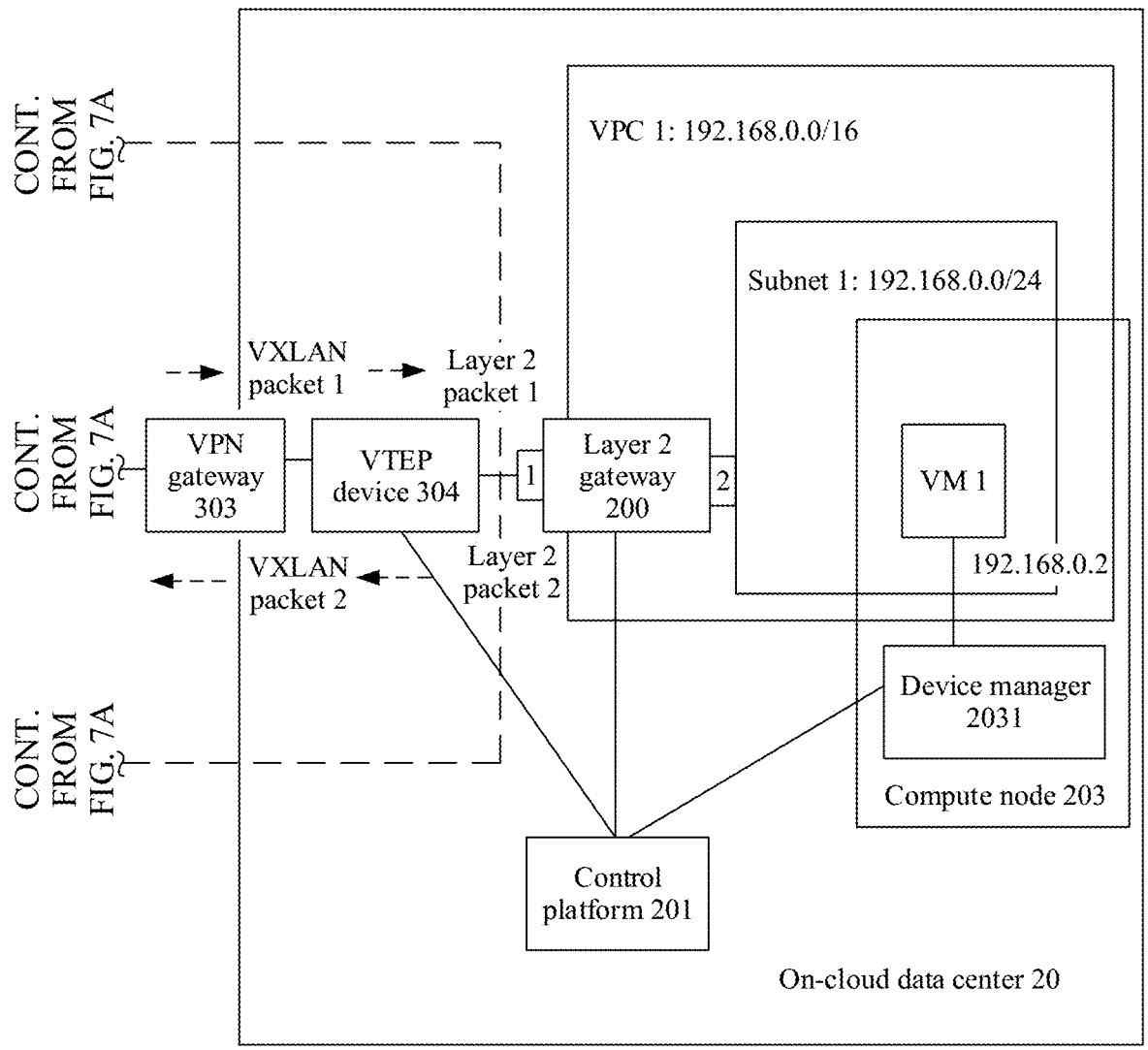

FIG. 7A and FIG. 7B are a specific schematic structural diagram of a system of a hybrid cloud environment according to an embodiment of the present application. Based on FIG. 4, FIG. 7A and FIG. 7B further show a possible implementation of the layer 2 communication tunnel 30.

As shown in FIG. 7A and FIG. 7B, the layer 2 communication tunnel 30 is implemented by using a VTEP device 301, a VTEP device 304, a VPN gateway 302, and a VPN gateway 303. The VTEP device 301 is connected to the subnet 2, and the VTEP device 304 is connected to the network interface card 1 of the layer 2 gateway 200. The VTEP device 301 is disposed with a VTEP IP 1, the VTEP device 304 is disposed with a VTEP IP 2, the VPN gateway 302 is disposed with a public IP 1, and the VPN gateway 303 is disposed with a public IP 2.

In this embodiment, the VTEP device 304 encapsulates the layer 2 packet 1 sent by the PM 1 into an inner packet of a VXLAN packet 1. A source IP address of an outer packet of the VXLAN packet 1 is the VTEP IP 1, a destination IP address of the outer packet is the VTEP IP 2, a source MAC address of the outer packet is a MAC address of the VTEP device 301, and a destination MAC address of the outer packet is a MAC address of a next-hop device to the VTEP IP 2 (for example, a MAC address of the VPN gateway 302). The VTEP device 301 sends the VXLAN packet 1 to the VPN gateway 302, and the VPN gateway 302 sets the VXLAN packet 1 in a payload of a VPN packet 1. A source IP address of a VPN header of the VPN packet 1 is the public IP 1 of the VPN gateway 302, a destination IP address is the public IP 2 of the VPN gateway 303, a source MAC address is the MAC address of the VPN gateway 302, and a destination MAC address is a MAC address of a next-hop device. The VPN gateway 302 sends the VPN packet 1 to the internet, and a routing device in the internet forwards the VPN packet 1 to the VPN gateway 303 based on the destination IP address of the VPN packet 1.

The VPN gateway 303 receives the VPN packet 1, obtains the VXLAN packet 1 from the payload of the VPN packet 1, and sends the VXLAN packet 1 to the VTEP device 304 based on the destination IP address (the VTEP IP 2) of the VXLAN packet 1.

The VTEP device 304 decapsulates the VXLAN packet 1, to obtain the layer 2 packet 1, and sends the layer 2 packet 1 to the network interface card 1 of the layer 2 gateway 200.

VXLAN encapsulation, VPN encapsulation, VPN decapsulation, and VXLAN decapsulation are implemented by using a device in the layer 2 communication tunnel 30, so that the subnet 2 of the on-premises data center 10 can implement layer 2 communication with the layer 2 gateway 200 of the on-premises data center 10. The PM 1 and the layer 2 gateway 200 are unaware of the foregoing encapsulation and decapsulation processes, and the layer 2 packet 1 is transmitted from the subnet 2 to the subnet 1 without change.

Similarly, the VTEP device 304 encapsulates the layer 2 packet 2 sent by the layer 2 gateway 200 by using the network interface card 1 into an inner packet of a VXLAN packet 2. A source IP address of an outer packet of the VXLAN packet 2 is the VTEP IP 2, a destination IP address is the VTEP IP 1, a source MAC address is a MAC address of the VTEP device 304, and a destination MAC address is a MAC address of a next-hop device to the VTEP IP 1. The VTEP device 304 sends the VXLAN packet 2 to the VPN gateway 303, and the VPN gateway 302 encapsulates the VXLAN packet 2 into a payload of a VPN packet 2. A source IP address of a VPN header of the VPN packet 2 is the public IP 2 of the VPN gateway 303, a destination IP address is the public IP 1 of the VPN gateway 302, a source MAC address is a MAC address of the VPN gateway 303, and a destination MAC address is a MAC address of a next-hop device to the public IP 1. The VPN gateway 303 sends the VPN packet 2 to the internet, and a routing device in the internet forwards the VPN packet 2 to the VPN gateway 302 based on a destination IP address of the VPN packet 2.

The VPN gateway 302 receives the VPN packet 2, obtains the VXLAN packet 2 from the payload of the VPN packet 2, and sends the VXLAN packet 2 to the VTEP device 301 based on the destination IP address (the VTEP IP 1) of the VXLAN packet 2.

The VTEP device 301 decapsulates the VXLAN packet 2 to obtain the layer 2 packet 2, and sends the layer 2 packet 2 to the PM 1.

Similarly, the VXLAN encapsulation, the VPN encapsulation, the VPN decapsulation, and the VXLAN decapsulation are implemented by using the device in the layer 2 communication tunnel 30, so that the layer 2 gateway 200 of the on-premises data center 10 can implement the layer 2 communication with the PM 1 of the on-premises data center 10. The PM 1 and the layer 2 gateway 200 are unaware of the foregoing encapsulation and decapsulation processes, and the layer 2 packet 2 is transmitted from the subnet 1 to the subnet 2 without change.

The layer 2 packet 1 is encapsulated into the inner packet of the VXLAN packet 1, so when the layer 2 packet 1 arrives at the layer 2 gateway 200 from the PM 1 through the layer 2 communication tunnel 30, the source MAC address and the destination MAC address of the layer 2 packet 1 remain unchanged. The layer 2 packet 2 is encapsulated into the inner packet of the VXLAN packet 2, and when the layer 2 packet 2 arrives at the PM 1 from the layer 2 gateway 200 through the layer 2 communication tunnel 30, the source MAC address and the destination MAC address of the layer 2 packet 2 remain unchanged. Therefore, the layer 2 communication channel 30 may implement the layer 2 communication between the PM 1 and the layer 2 gateway 200.

Similarly, an ARP request packet and an ARP reply packet between the PM 1 and the layer 2 gateway 304 may also be transmitted through the layer 2 communication tunnel 30 in the foregoing manner.

In this embodiment, a VPN gateway is configured to implement cross-data center remote communication, a VTEP device is configured to implement layer 2 communication, and the VPN gateway and the VTEP device may cooperate to implement cross-data center remote layer 2 communication.

In another embodiment of the present application, the VPN gateway may be replaced with another remote connection gateway, for example, a manual gateway. The VTEP device accesses, by using the manual gateway, a private line network provided by an operator, and does not need to perform VPN encapsulation and decapsulation operations on a VXLAN packet. For example, a local manual gateway may directly send the VXLAN packet to a private line network, and a routing device in the private line network forwards the VXLAN packet to a peer manual gateway based on a destination IP address of the VXLAN packet.

Further, this embodiment of the present application is not limited to encapsulating or decapsulating packets in the subnet 1 and the subnet 2 by using VXLAN technology only. In this embodiment of the present application, any large layer 2 encapsulation/decapsulation technology may also be used to implement a similar function, for example, it is feasible to replace the VXLAN technology with GRE technology to implement packet encapsulation and decapsulation.

Figure 8C:
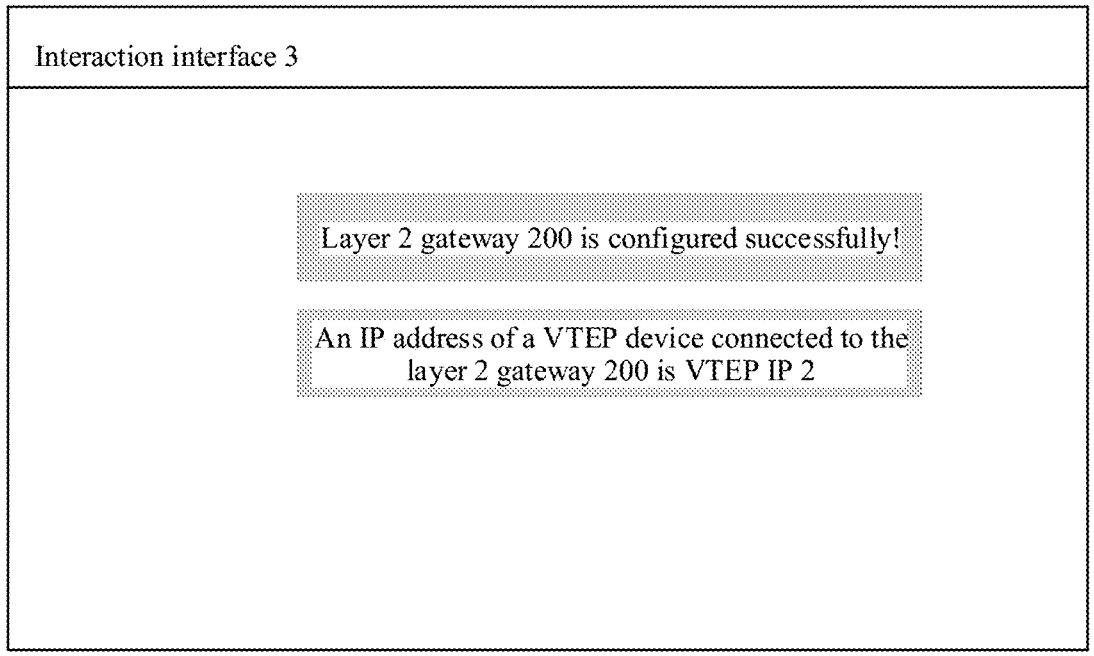
Figure 9A:
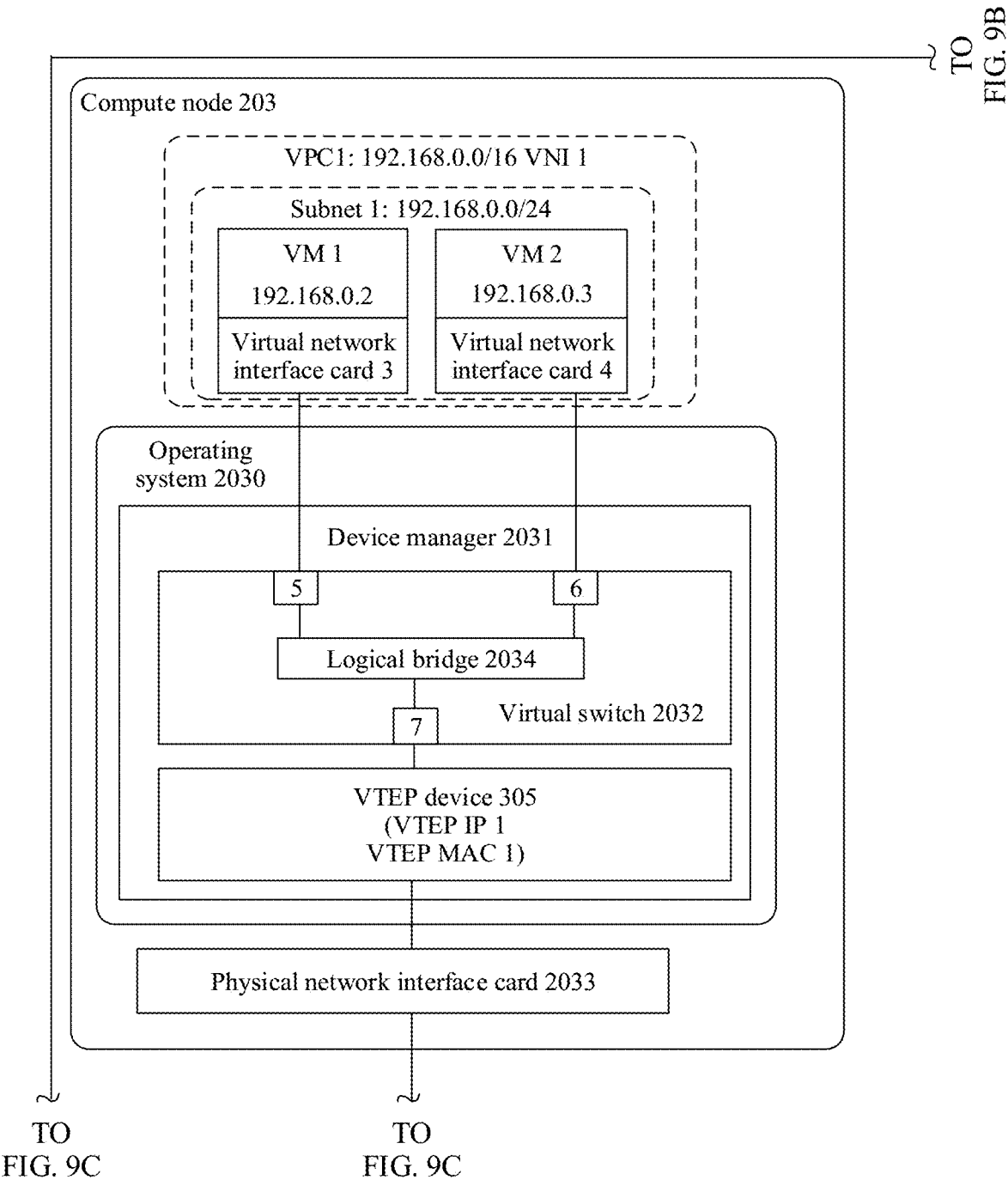
Figure 9B:
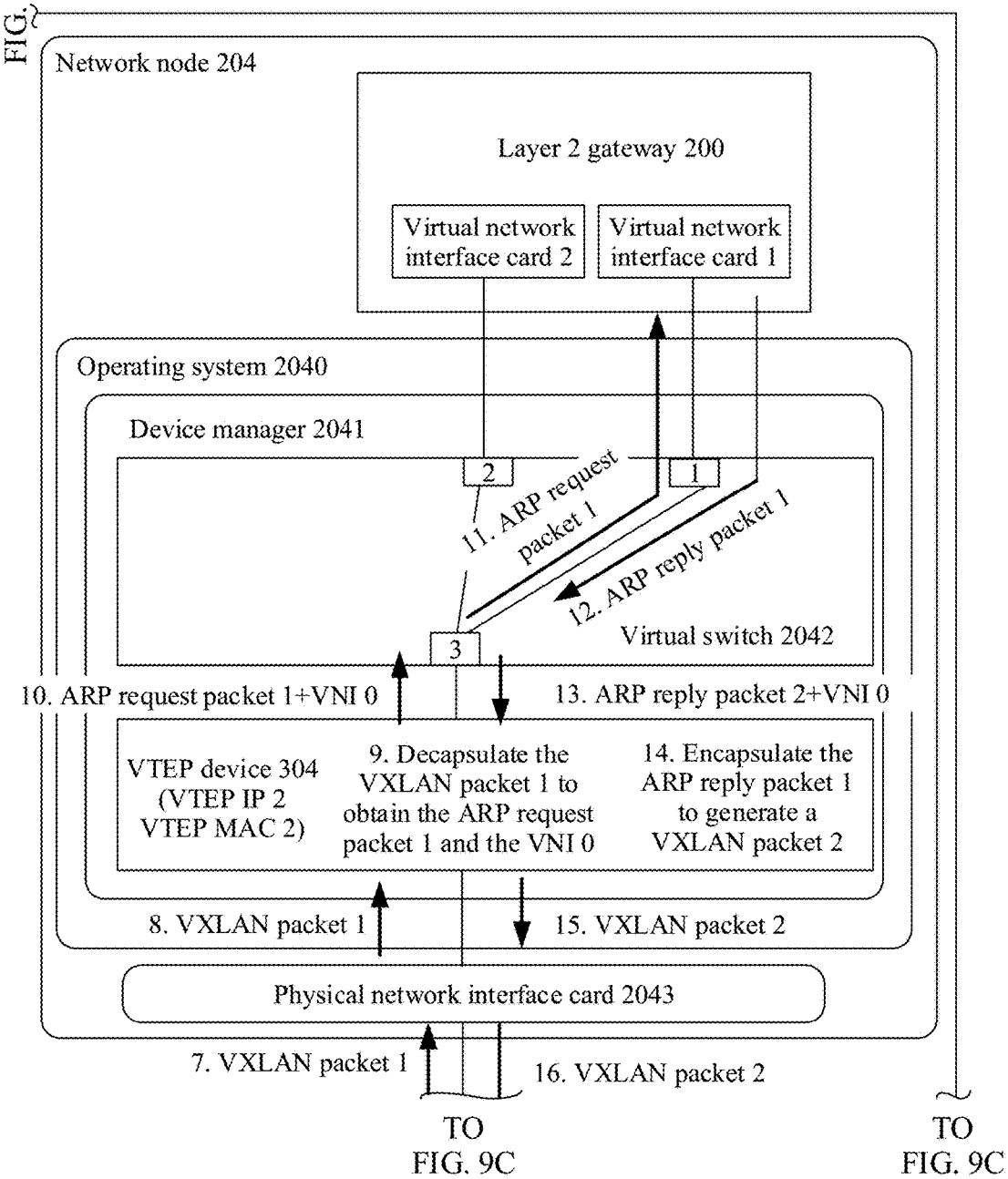
Figure 9D:
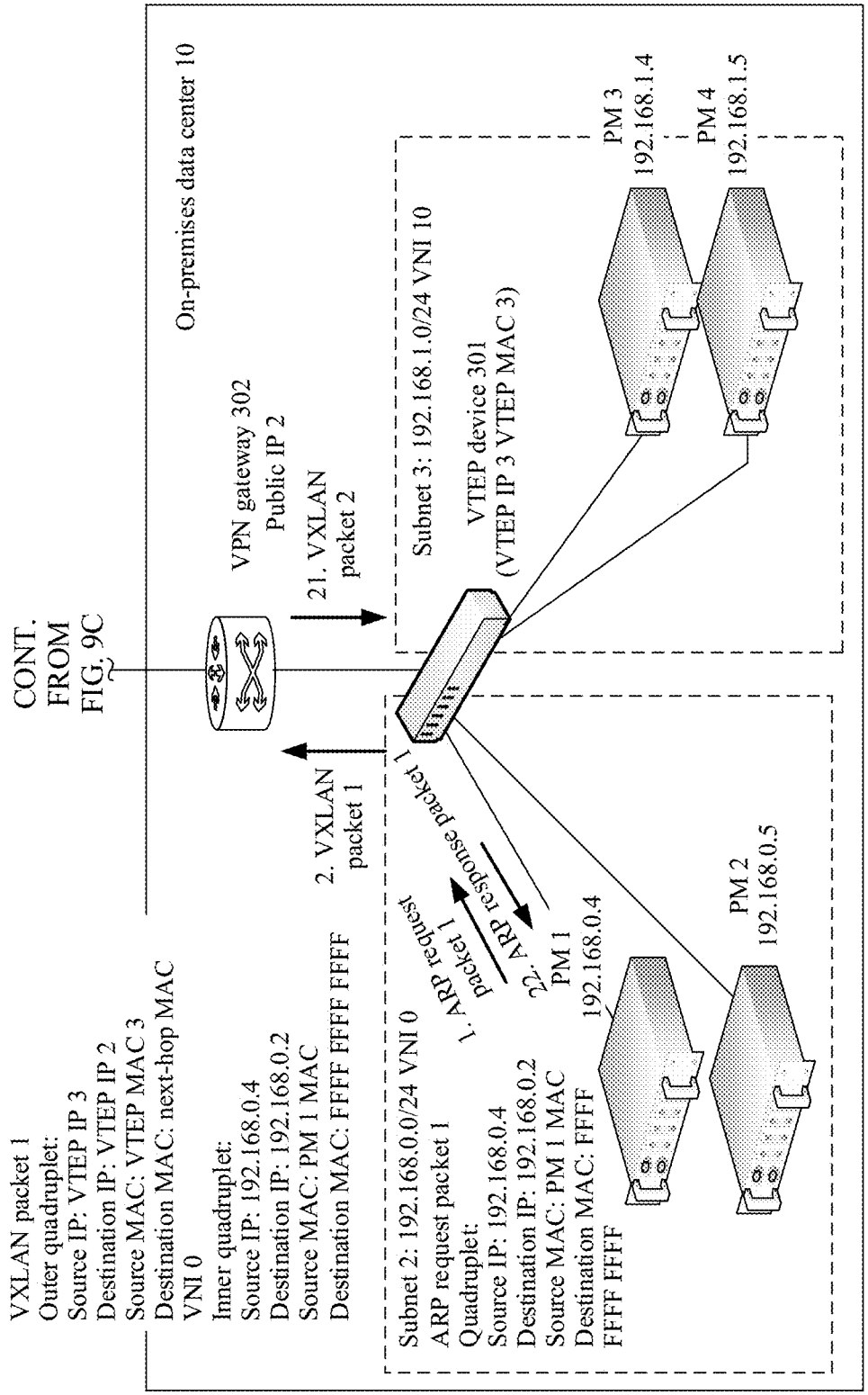
Figure 10A:
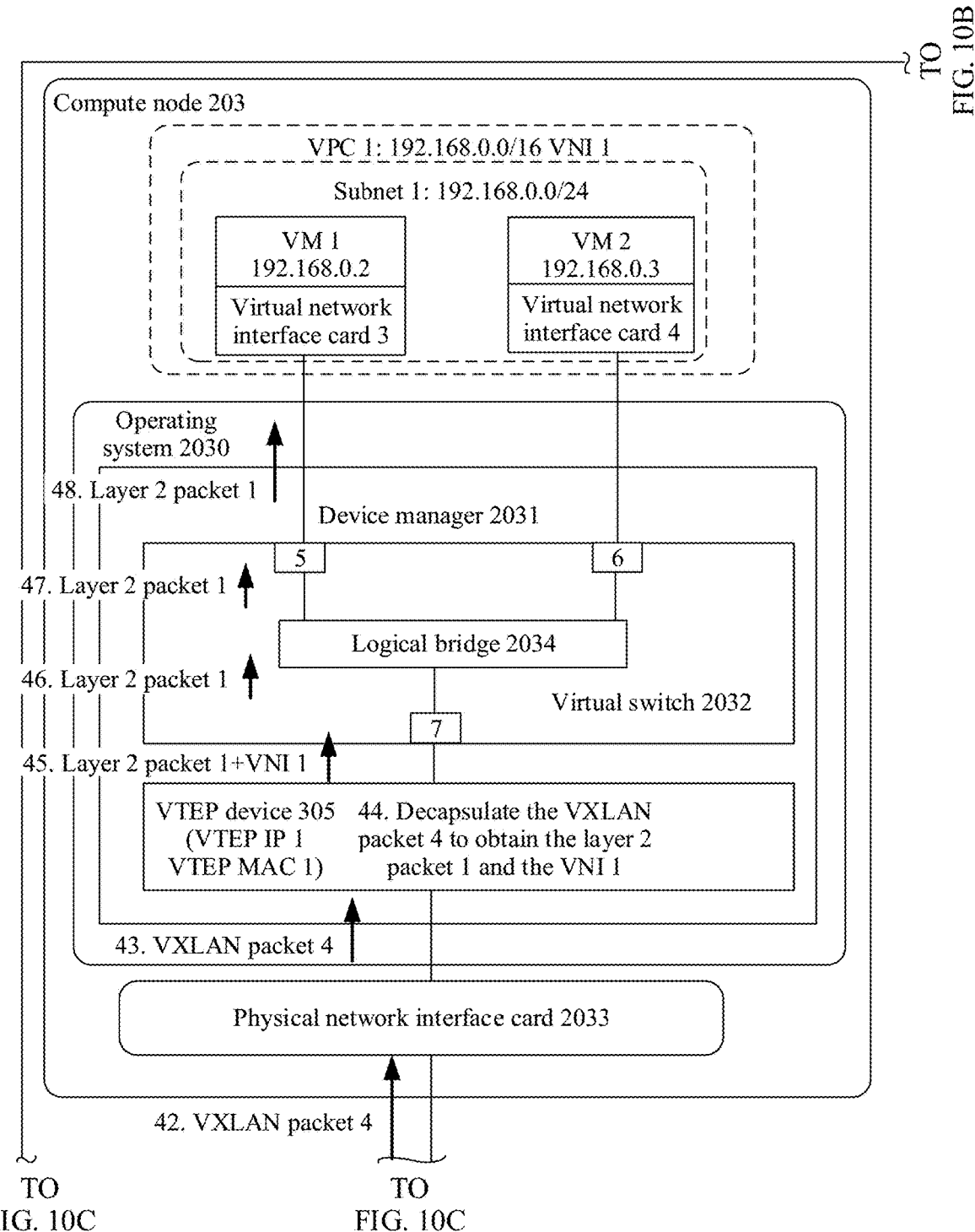
Figure 10B:
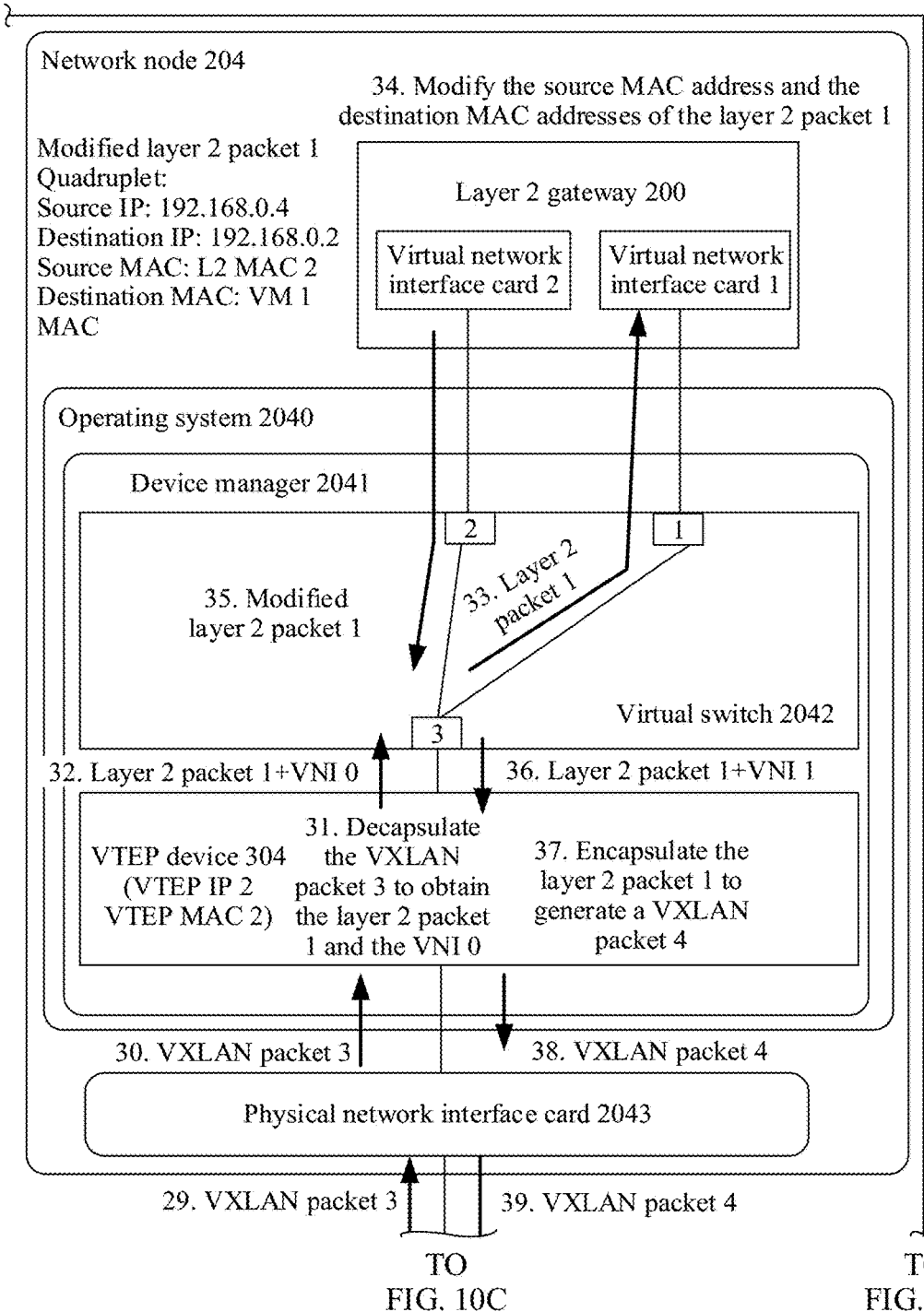
Figure 10D:
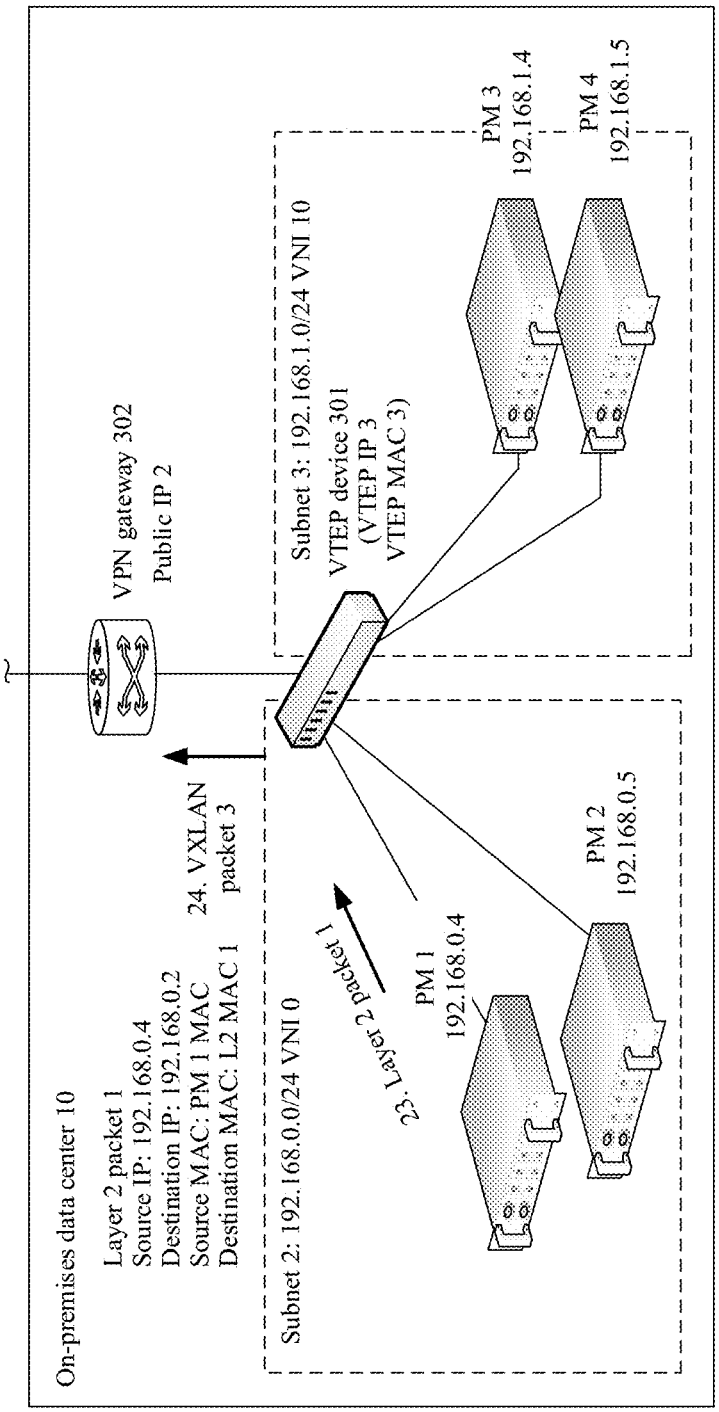
Figure 11A:
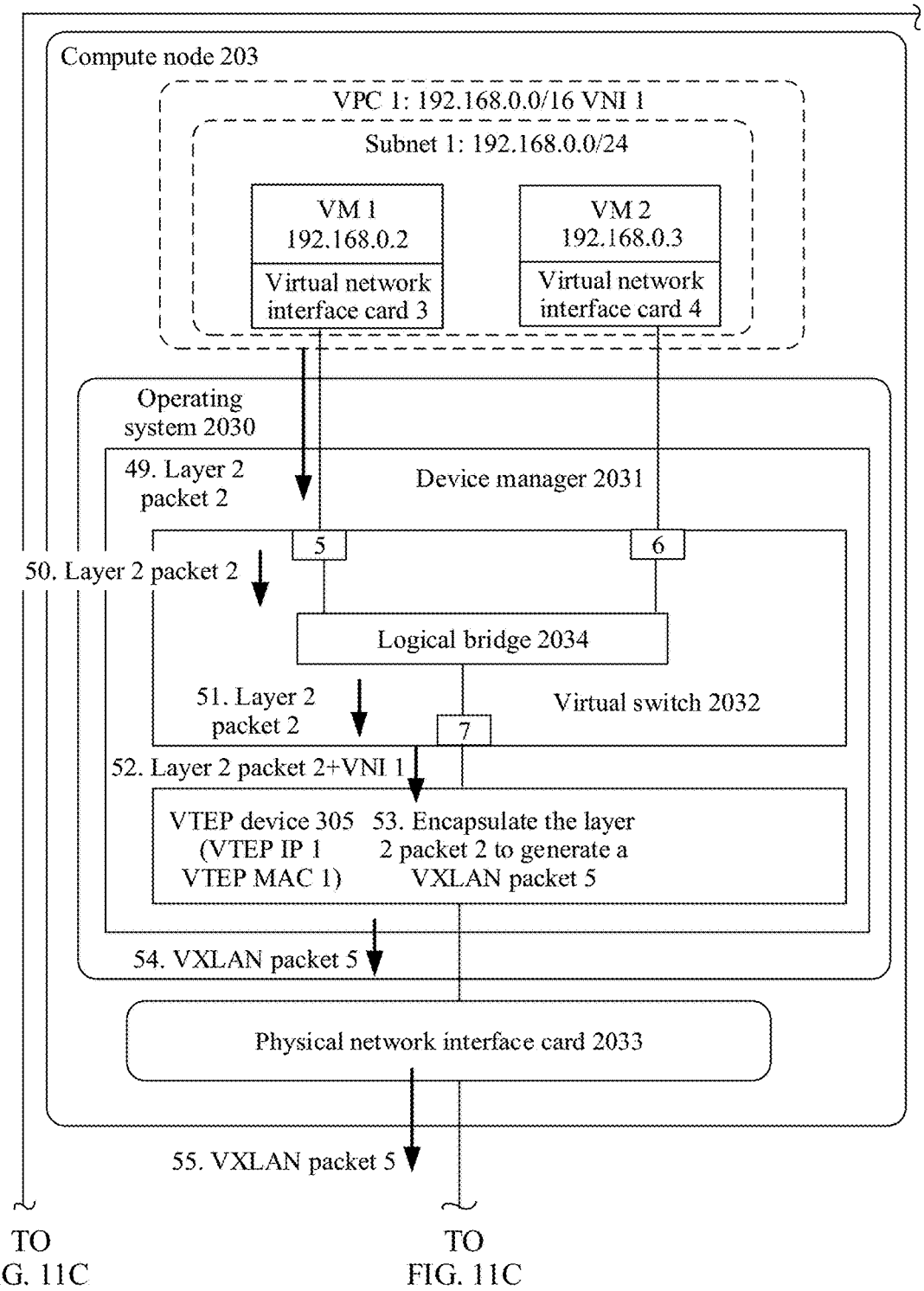
Figure 11B:
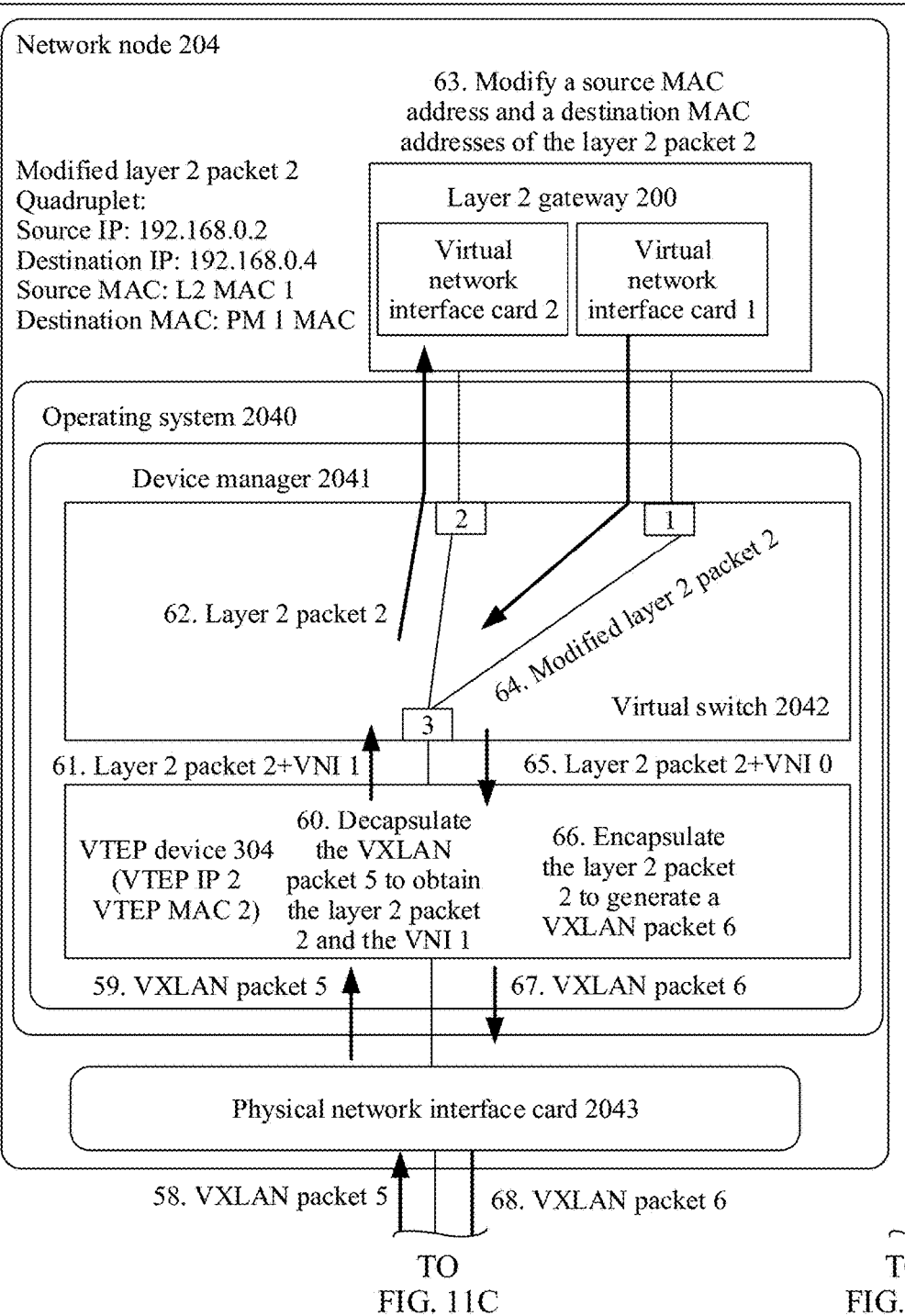
Figure 11D:
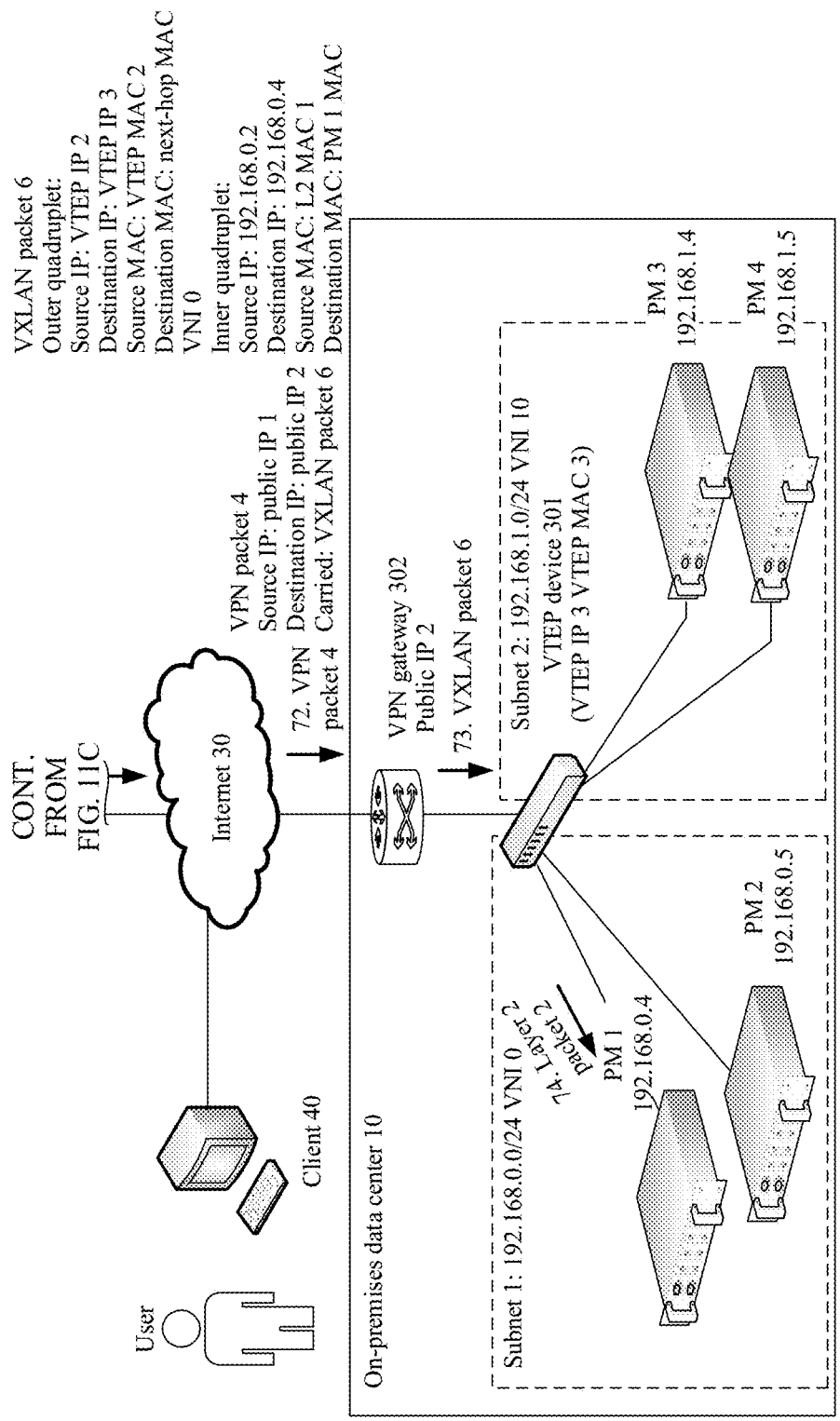
Figure 12A:
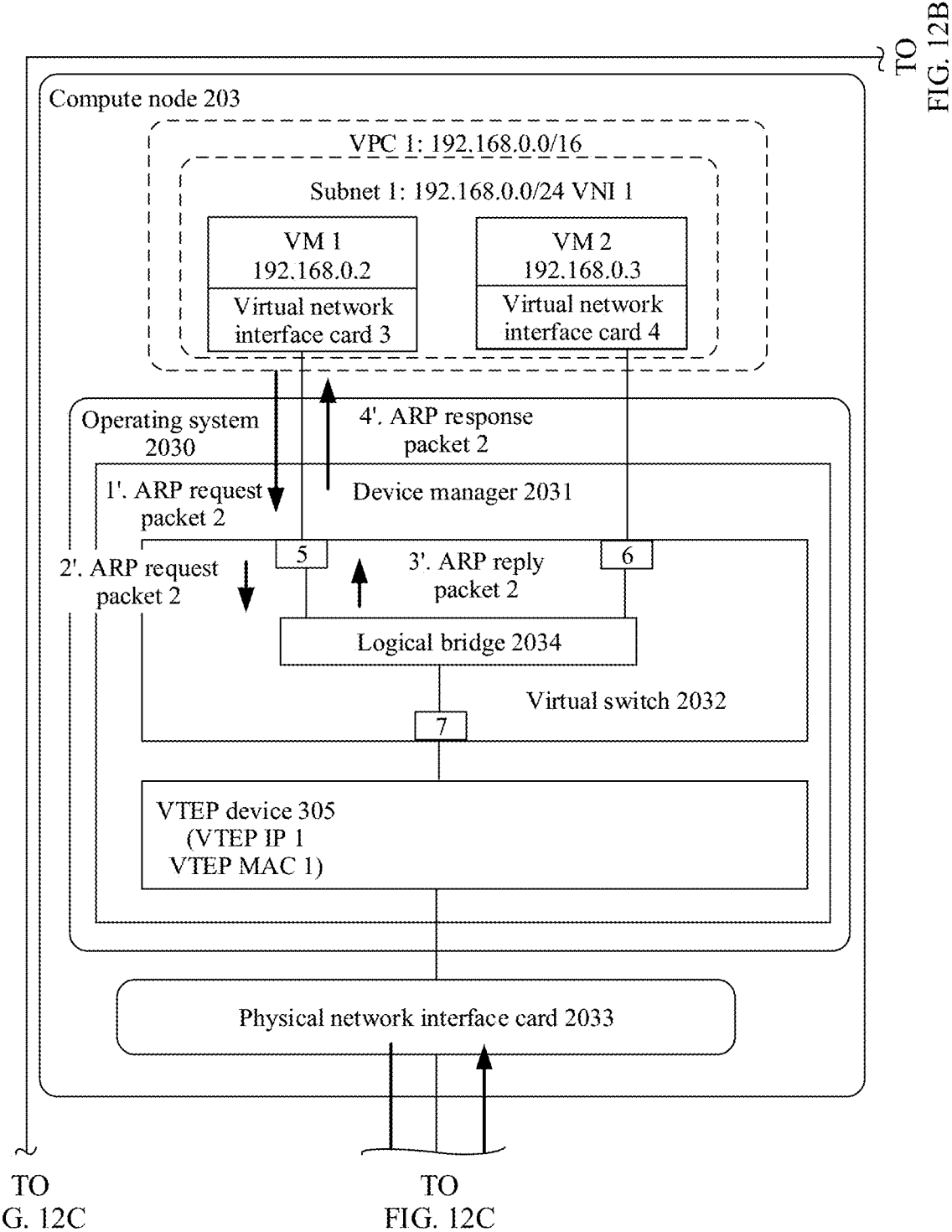
Figure 12B:
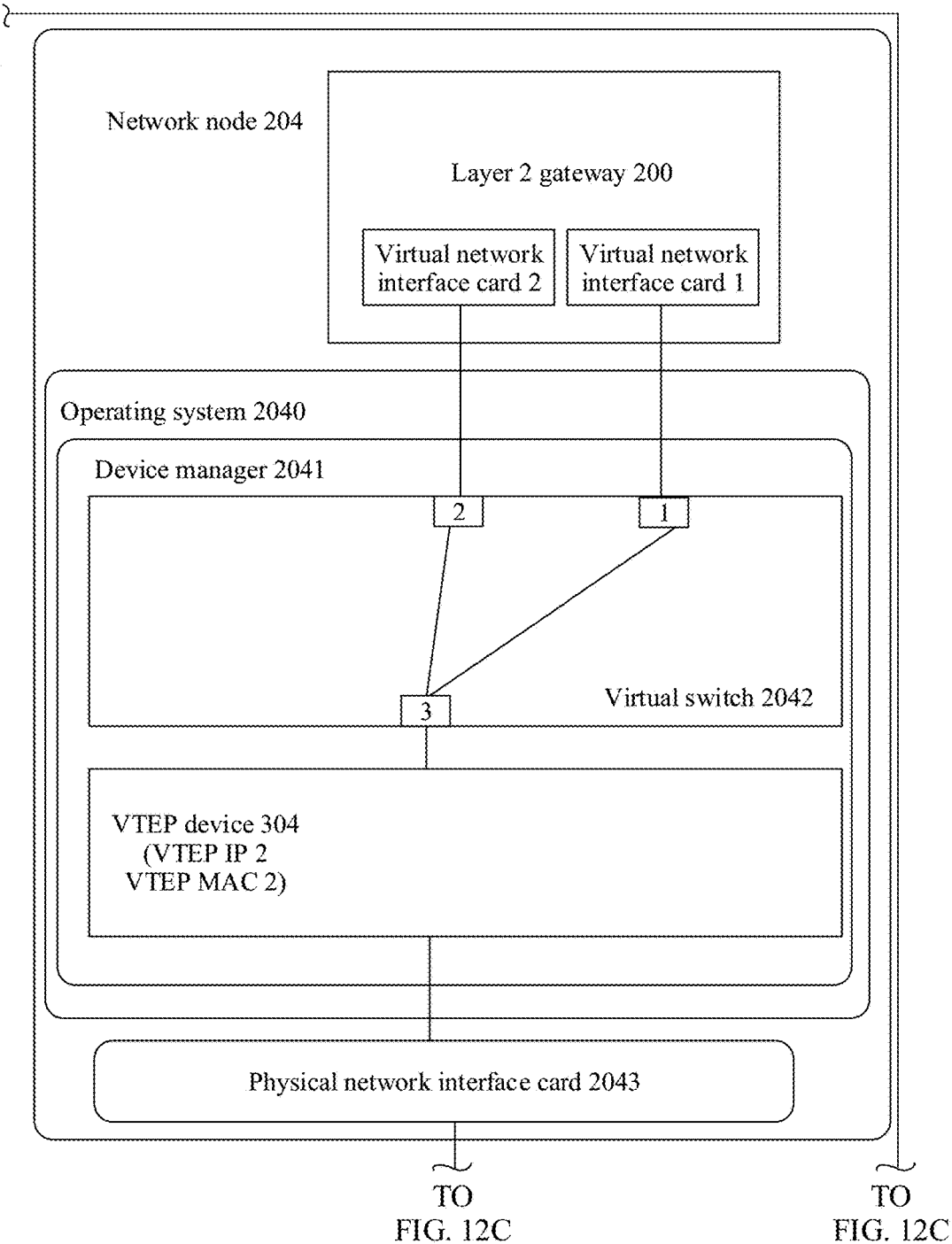
Figure 12D:
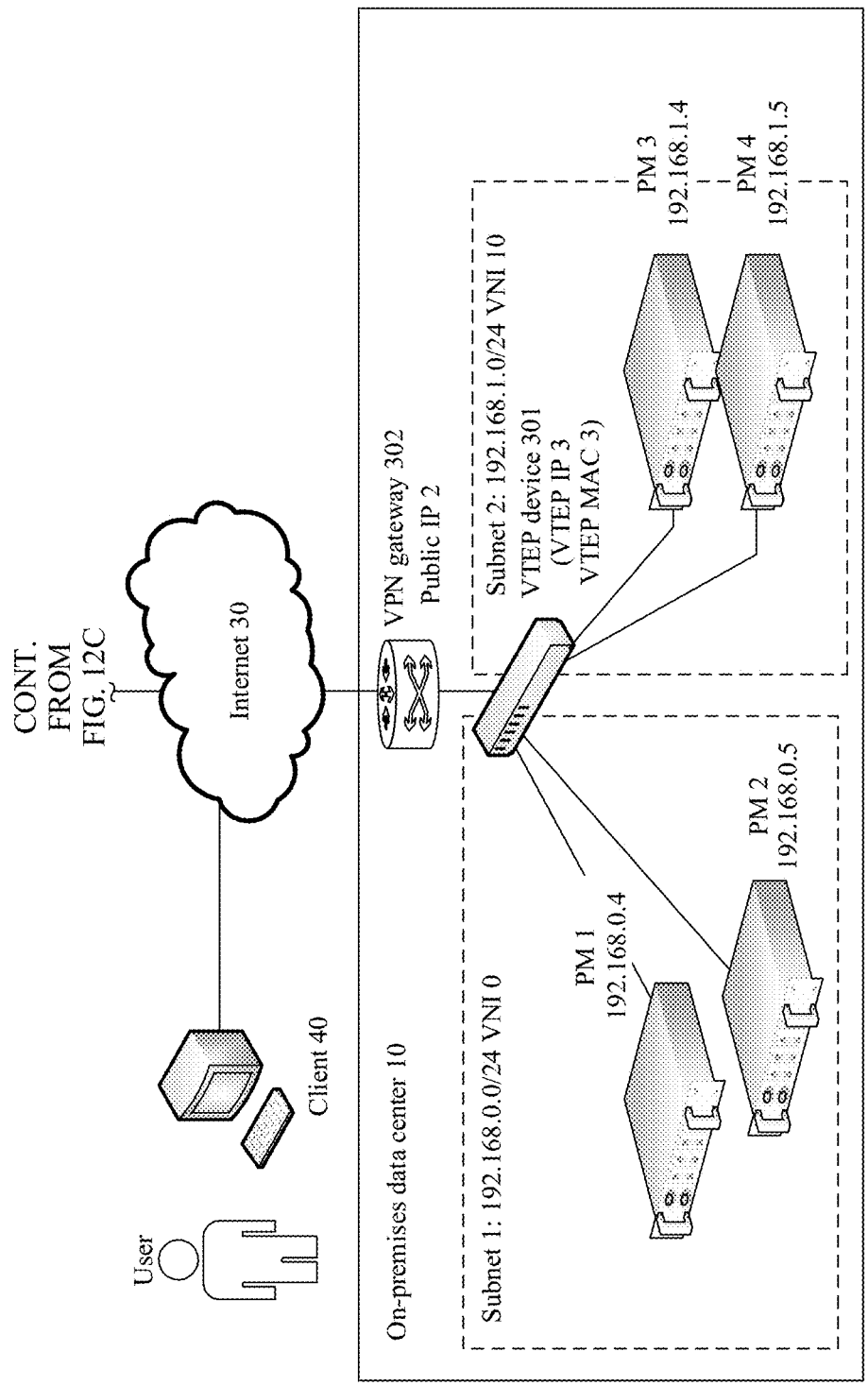

FIG. 8A to FIG. 8C are schematic diagrams of interaction interfaces provided by a control platform according to an embodiment of the present application. As shown in FIG. 8A, the control platform 201 provides an interaction interface 1, and a selection box "creating a layer 2 gateway" is disposed on the interaction interface 1. When a user clicks the selection box, an interaction interface 2 shown in FIG. 8B is displayed. In the interaction interface 2, the user inputs configuration information, and the configuration information includes a name of a layer 2 gateway to be created, local tunnel information, a VPC to which the layer 2 gateway to be created belongs, a subnet connected to the layer 2 gateway in the VPC to which the layer 2 gateway belongs, and peer tunnel information. After the user click a button "Yes", the interface shown in FIG. 8C is displayed. The interface is used to indicate that the layer 2 gateway 200 is successfully configured.

For example, the following is described with reference to the layer 2 communication tunnel shown in FIG. 7A and FIG. 7B. The user may input (or select) the VPN gateway 303 in a local tunnel information input box, and the user may input a VTEP IP 3 of the VTEP device 301 and a VNI 0 of the subnet 2 in a peer tunnel information input box. The VNI 0 is set by the VTEP device 301, and a user has full management permission on the VTEP device 301 in the on-premises data center 10, so that the VTEP IP 1 and the VNI 0 are parameters known by the user.

It should be noted that, in this embodiment, it is assumed that a VPN connection has been established between the VPN gateway 302 and the VPN gateway 303, and the user only needs to input the VPN gateway 303 to be connected to the layer 2 gateway 200, so that a layer 2 gateway 200 can be remotely connected to the on-premises data center 10.

The user may create the VPN gateway 303 by using a VPN service provided by the on-cloud data center 20, and configure the VPN gateway 303 to be connected to the VPN gateway 302.

It should be noted that, in FIG. 8C, when an interaction interface 3 prompts that the layer 2 gateway 200 is successfully configured, the user may be further prompted with the VTEP IP 2 of the VTEP device 304 connected to the layer 2 gateway 200. The user obtains the VTEP IP 2 from the interaction interface 3, and disposes the VTEP device 301 in the on-premises data center 10, so that the VTEP device 301 records the VTEP IP 2. When performing the VXLAN encapsulation, the VTEP device 301 may set an outer destination IP address of the VXLAN packet to the VTEP IP 2. After the encapsulated VXLAN packet arrives at the on-cloud data center 20 through the VPN gateway 303, the VXLAN packet is routed to the VTEP device 304 by using the destination IP address of the outer packet VTEP IP 2 in an internal network of the on-cloud data center 20.

For ease of understanding, refer to FIG. 9A to FIG. 12D. FIG. 9A to FIG. 12D show a possible specific implementation of the hybrid cloud environment disclosed in FIG. 7A and FIG. 7B.

Hybrid cloud environments shown in FIG. 9A to FIG. 12D are completely the same. A difference lies in that FIG. 9A to FIG. 9D describe in detail a packet flow when the layer 2 gateway 200 performs ARP proxy on the PM 1, FIG. 10A to FIG. 10D describe in detail a packet flow when the PM 1 actively sends a packet to the VM 1, FIG. 11A to FIG. 11D describe in detail a packet flow when the VM 1 responds to the PM 1, and FIG. 12A to FIG. 12D describe in detail a packet flow when a device manager performs the ARP proxy on the VM 1.

In addition, compared with FIG. 7A and FIG. 7B, same reference numerals in FIG. 9A to FIG. 12D represent same devices.

First, refer to FIG. 9A to FIG. 9D. A hybrid cloud communications system includes an on-cloud data center 10 and an on-premises data center 20. The on-cloud data center 20 and the on-premises data center 10 separately access internet 30. A user accesses the internet 30 by using a client 40. The user has management permission on all devices in the on-premises data center 10. In addition, the user has management permission only on the VPC 1, the layer 2 gateway 200, and the VPN gateway 303 in the on-cloud data center 20. By operating the client 40, the user accesses an interaction interface or an API provided by the access control platform 201, and enters a command for managing the VPC 1, the layer 2 gateway 200, or the VPN gateway 303. The control platform 201 manages the VPC 1, the layer 2 gateway 200, or the VPN gateway 303 according to the command.

It should be noted that the client 40 is, for example, a terminal device such as a mobile phone, a personal computer, or a personal tablet computer. In another embodiment, the client 40 may also be disposed in the on-premises data center 10.

The on-cloud data center 20 includes the control platform 201, the compute node 203, a network node 204, a router 205, a top of rack switch 206, and a top of rack switch 207. The top of rack switch 206, the top of rack switch 207, the control platform 201, and the VPN gateway 303 all are connected to the router 205.

The compute node 203 and the network node 204 are, for example, servers. The virtual machine VM 1 and the VM 2 provided by a public cloud services run on the compute node 203, and the layer 2 gateway 200 runs on the network node 204.

The compute node 203 includes the VM 1, the VM 2, an operating system 2030, and a physical network interface card 2033. The device manager 2031 is disposed in the operating system 2030. The device manager 2031 includes a virtual switch 2032 and a VTEP device 305. A virtual port 5, a virtual port 6, a virtual port 7, and a logical bridge 2034 are disposed in the virtual switch 2032, where the logical bridge 2034 is connected to the virtual port 5, the virtual port 6, and the virtual port 7. A virtual network interface card 3 is disposed on the VM 1, and a virtual network interface card 4 is disposed on the VM 2. The virtual network interface card 3 is connected to the virtual port 5, the virtual network interface card 4 is connected to the virtual port 6, and the virtual port 7 is connected to the VTEP device 305. The VTEP device 305 is further connected to the physical network interface card 2033, and the compute node 203 accesses the top of rack switch 206 by using the physical network interface card 2033.

The VM 1 and the VM 2 are disposed in the subnet 1 of the VPC 1, a tunnel identifier of the VPC 1 is a VNI 1, and the logical bridge 2034 is configured to implement a switch function of the subnet 1.

The network node 204 includes the layer 2 gateway 200, an operating system 2040, and a physical network interface card 2043. A device manager 2041 is disposed in an operating system 201. The device manager 2041 includes a virtual switch 2042 and the VTEP device 304. The virtual switch 2042 includes a virtual port 1, a virtual port 2, and a virtual port 3. The virtual port 3 is connected to the virtual port 2, and the virtual port 3 is further connected to the virtual port 1. The VTEP device 304 is connected to the physical interface card 2043, and the compute node 204 accesses the top of rack switch 207 by using the physical network interface card 2043.

The layer 2 gateway 200 is disposed with a virtual network interface card 1 and a virtual network interface card 2. The virtual network interface card 1 is connected to the virtual port 1, the virtual network interface card 2 is connected to the virtual port 2, and the virtual port 3 is connected to the VTEP device 304.

The on-premises data center 10 includes the VPN gateway 302, the VTEP device 301, the subnet 2, and a subnet 3. A private network address segment of the subnet 2 is the same as that of the subnet 1 (both are 192.168.0.0/24). The physical machine PM 1 and the PM 2 are disposed in the subnet 2, and a PM 3 and a PM 4 are disposed in the subnet 3.

The VTEP device 301 is, for example, a VXLAN switch. The VXLAN switch has a switch function and a VXLAN encapsulation and decapsulation function. The subnet 2 and the subnet 3 are divided by the VTEP device 301. The VTEP device 301 sets a tunnel identifier of the subnet 2 to the VNI 0, and sets a tunnel identifier of the subnet 3 to the VNI 1.

In this embodiment, the VTEP device 305 and the VTEP device 304 are implemented by using software. The VTEP device 305 is implemented by using a kernel of the operating system 2030 of the compute node 203, the VTEP device 304 is implemented by using a kernel of the operating system 2040 of the network node 204, and the VTEP device 301 is implemented by using hardware, for example, the VXLAN switch.

In another embodiment of the present application, the VTEP device 301 may also be implemented by using an operating system kernel. In this case, the VTEP device 301 is connected to a virtual machine that runs in an operating system of a physical machine in the on-premises data center 10.

Further, in the hybrid cloud communications system in this embodiment, network parameters of each device is set to:
the private network address of the VM 1: 192.168.0.2; the virtual network interface card 3 of the VM 1 has a MAC address: the VM 1 MAC;
the private network address of the VM 2: 192.168.0.3; the virtual network interface card 4 of the VM 2 has a MAC address: the VM 2 MAC;
a VTEP IP address: the VTEP IP 1 is set for the VTEP device 305;
a VTEP IP address: the VTEP IP 2 is set for the VTEP device 304;
a VTEP IP address: the VTEP IP 3 is set for the VTEP device 302;
the VPN gateway 302 is set with: the public IP 1;
the VPN gateway 303 is set with: the public IP 2;
a tunnel identifier of the subnet 1 is: the VNI 1;
a tunnel identifier of the subnet 2 is: the VNI 0;
a MAC address of the virtual network interface card 1 of the layer 2 gateway 200: the L2 MAC 1; and
a MAC address of the virtual network interface card 2 of the layer 2 gateway 200: the L2 MAC 2.

The foregoing network parameters are all recorded in the control platform 201. It should be noted that the public IP 1 of the VPN gateway 302, the VNI 0 of the subnet 2, and the VTEP IP 3 of the VTEP device 301 are input into the control platform 301 by the user using the operation client 40. The VTEP IP 3 and the VNI 0 are input from the client 40 when the layer 2 gateway 200 is created. For details, refer to the interaction interface 2 shown in FIG. 8B. The public IP 1 of the VPN gateway 302 is input from the client 40 when VPN connection is configured.

In the on-premises data center 10:
the private network address of the PM 1: 192.168.0.4; the MAC address of the PM 1: the PM 1 MAC;
the private network address of the PM 2: 192.168.0.5; the MAC address of the PM 2: the PM 2 MAC;
a private network address of the PM 3: 192.168.1.4; a MAC address of the PM 3: a PM 3 MAC; and
a private network address of the PM 4: 192.168.1.5; a MAC address of the PM 4: a PM 4 MAC.

The control platform 201 has no management permission on the on-premises data center 10. The control platform 201 does not record network addresses of physical machines in the on-premises data center 10, and these network addresses need to be learned by the layer 2 gateway 200.

The router 205, the top of rack switch 206, the top of rack switch 207, the physical network interface card 2033, and the physical network interface card 2043 are all set with an IP address and have a packet forwarding function.

The router 205 records a routing rule, and when receiving a packet whose destination IP address is the VTEP IP 1, the router sends the packet to the top of rack switch 206; when receiving a packet whose destination IP address is the VTEP IP 2, the router sends the packet to the top of rack switch 207; and when receiving a packet whose destination IP address is the VTEP IP 3, the router sends the packet to the VPN gateway 303.

The physical network interface card 2033 forwards a packet received from the VTEP device 305 to the top of rack switch 206, and forwards a packet received from the top of rack switch 206 to the VTEP device 305. The top of rack switch 206 forwards a packet received from the physical network interface card 2033 to the router 205, and forwards a packet received from the router 205 to the physical network interface card 2033.

The physical network interface card 2043 forwards a packet received from the VTEP device 304 to the top of rack switch 207, and forwards a packet received from the top of rack switch 207 to the VTEP device 304. The top of rack switch 207 forwards a packet received from the physical network interface card 2043 to the router 205, and forwards a packet received from the router 205 to the physical network interface card 2043.

The VPN connection is already pre-established between the VPN gateway 303 and the VPN gateway 302, where the public IP 1 of the VPN gateway 302 is input from the client 40 when the VPN connection is configured.

Furthermore,
the VTEP device 305 records:
a correspondence between the VNI 1 and the VTEP IP 2; and
the VTEP device 304 records:
a correspondence between the VNI 1 and the VTEP IP 1; and
a correspondence between the VNI 0 and the VTEP IP 3.

The virtual port 3 records a correspondence between the virtual port 2 and the VNI 1, and a correspondence between the virtual port 1 and the VNI 0.

The foregoing correspondences are all set and recorded by the control platform 201.

In this embodiment of the present application, the layer 2 gateway 200 is connected, by using the virtual network interface card 1, to the virtual port 1 bound to the VNI 0, to be connected to the subnet 2. In addition, the layer 2 gateway 200 is connected, by using the virtual network interface card 2, to the virtual port 2 bound to the VNI 1, to be connected to the subnet 1.

Based on the foregoing setting, FIG. 9A to FIG. 9D describe a method that the PM 1 actively communicates with the VM 1. The method includes the following steps.

Step 1: The PM 1 constructs the ARP request packet 1, and sends the ARP request packet 1 to the VTEP device 301.

The PM 1 records the private IP address 192.168.0.2 of the VM 1, and broadcasts the ARP request packet 1 in the subnet 2 to request the MAC address corresponding to 192.168.0.2. A quadruplet of the ARP request packet 1 is as follows:
- a source IP: 192.168.0.4;
- a destination IP: 192.168.0.2;
- a source MAC: the PM 1 MAC; and
- a destination MAC: FFFF FFFF FFFF.

Step 2: The VTEP device 302 sends the VXLAN packet 1 to the VPN gateway 302.

The VTEP device 302 receives the ARP request packet 1 broadcast by the PM 1 in the subnet 2, and encapsulates the ARP request packet 1 into the inner packet of the VXLAN packet 1. The destination IP address of the outer packet of the VXLAN packet 1 is the VTEP IP 2 (a VTEP IP of the VTEP device 304), and a VXLAN header of the VXLAN packet 1 further carries the tunnel identifier VNI 0 allocated by the VTEP device 302 to the subnet 2.

An inner quadruplet and an outer quadruplet of the VXLAN packet 1 are as follows:

the outer quadruplet:
- a source IP: the VTEP IP 3;
- a destination IP: the VTEP IP 2;
- a source MAC: a VTEP MAC 3; and
- a destination MAC: a next-hop MAC (the MAC address of the VPN gateway 303); and the inner quadruplet:
- a source IP: 192.168.0.4;
- a destination IP: 192.168.0.2;
- a source MAC: the PM 1 MAC; and
- a destination MAC: FFFF FFFF FFFF.

In this embodiment of the present application, the layer 2 gateway 200 receives and intercepts the ARP request packet 1. Therefore, the VTEP device 302 needs to send, to the VTEP device 304 connected to the layer 2 gateway 200, the VXLAN packet 1 into which the ARP request packet 1 is encapsulated. Therefore, the destination IP address of the outer packet of the VXLAN packet 1 is the VTEP IP 2.

Step 3: The VPN gateway 302 sends the VPN packet 1 to the internet 30.

The VPN gateway 302 constructs the VPN packet 1, where the payload of the VPN packet 1 carries the VXLAN packet 1, the destination IP address of the VPN header of the VPN packet 1 is the public IP 1 (a public IP of the VPN gateway 303), and the source IP address is the public IP 2 (a public IP of the VPN gateway 302).

Step 4: A routing device of the internet 30 forwards the VPN packet 1 to the VPN gateway 303 based on the destination IP address of the VPN packet 1.

Step 5: The VPN gateway 303 sends the VXLAN packet 1 to the router 205.

After receiving the VPN packet 1, the VPN gateway 302 removes the VPN header, obtains the VXLAN packet 1 from the payload, and sends the VXLAN packet 1 to the router 205.

Step 6: The router 205 sends the VXLAN packet 1 to the top of rack switch 207 based on the destination IP address of the outer packet of the VXLAN packet 1.

Step 7: The top of rack switch 207 sends the VXLAN packet 1 to the physical network interface card 2043.

Step 8: The physical network interface card 2043 sends the VXLAN packet 1 to the VTEP device 304.

Step 9: The VTEP device 304 decapsulates the VXLAN packet 1, obtains the ARP request packet 1 from the inner packet, and obtains the VNI 0 from the VXLAN header.

Step 10: The VTEP device 304 sends the ARP packet 1 and the VNI 0 to the virtual port 3.

Step 11: The virtual port 3 sends the ARP request packet 1 to the virtual port 1, and the ARP request packet 1 arrives at the virtual network interface card 1 through the virtual port 1.

As discussed above, the virtual port 3 records the correspondence between the VNI 0 and the virtual port 1, and the correspondence between the VNI 1 and the virtual port 2.

Therefore, the virtual port 3 selects the virtual port 1 based on the VNI 0, and sends the ARP request packet 1 to the virtual port 1, so that the ARP request packet 1 arrives at the virtual network interface card 1 of the layer 2 gateway 200 through the virtual port 1.

Step 12: The layer 2 gateway 200 generates the ARP reply packet 1 based on the ARP request packet 1, and sends the ARP reply packet 1 to the virtual port 1 by using the virtual network interface card 1, and the ARP reply packet 1 arrives at the virtual port 3 through the virtual port 1.

In this step, the layer 2 gateway 200 determines, based on the destination MAC address FFFF FFFF FFFF of the ARP request packet 1, that the ARP request packet 1 is a broadcast packet. In this case, the layer 2 gateway 200 needs to intercept the ARP request packet 1, so that the broadcast packet cannot arrive at the subnet 1.

Correspondingly, the layer 2 gateway 200 constructs the ARP reply packet 1, and a
quadruplet of the ARP reply packet 1 is:
- a source IP: 192.168.0.2;
- a destination IP: 192.168.0.4;
- a source MAC: the L2 MAC 1; and
- a destination MAC: the PM 1 MAC.

The ARP reply packet 1 is used to notify the PM 1 that the MAC address corresponding to 192.168.0.2 is the MAC address of the virtual network interface card 1: the L2 MAC 1.

Further, in this step, the layer 2 gateway 200 learns and records the correspondence between 192.168.0.4 and the PM 1 MAC in the ARP request packet 1. The layer 2 gateway 200 records the correspondence in the local ARP entry.

Step 13: The virtual port 3 receives the ARP reply packet 1 from the virtual port 1, determines the VNI 0 according to the correspondence between the virtual port 1 and the VNI 0, and sends the ARP reply packet 1 and the VNI 0 to the VTEP device 304.

Step 14: The VTEP device 304 determines, based on the VNI 0, that the VTEP IP 3 (a VTEP IP of the VTEP device 301) encapsulates the ARP reply packet 1 to generate the VXLAN packet 2, where a VXLAN header of the VXLAN packet 2 carries the VNI 0, and an outer destination IP address of the VXLAN packet 2 is the VTEP IP 3.

An inner quadruplet and an outer quadruplet of the VXLAN packet 2 are as follows:
   the outer quadruplet:
     a source IP: the VTEP IP 2;
     a destination IP: the VTEP IP 3;
     a source MAC: a VTEP MAC 2; and
     a destination MAC: a next-hop MAC (a MAC address of the physical interface card 2043); and
   the inner quadruplet:
     a source IP: 192.168.0.2;
     a destination IP: 192.168.0.4;
     a source MAC: the L2 MAC 1; and
     a destination MAC: the PM 1 MAC.

The ARP reply packet 1 needs to be sent to the PM1. Therefore, the destination IP address of the VXLAN packet 2 is the VTEP IP3 of the VTEP device 301 connected to the PM 1.

Step 15: The VTEP device 304 sends the VXLAN packet 2 to the physical network interface card 2043.

Step 16: The physical network interface card 2043 sends the VXLAN packet 2 to the top of rack switch 207.

Step 17: The top of rack switch 207 sends the VXLAN packet 2 to the router 205.

Step 18: The router 205 sends the VXLAN packet 2 to the VPN gateway 303 based on the destination IP address of the outer packet of the VXLAN packet 2.

Step 19: The VPN gateway 303 receives the VXLAN packet 2, generates the VPN packet 2, and sends the VPN packet 2 to the internet 30.

The payload of the VPN packet 2 carries the VXLAN packet 2, the destination IP address of the VPN header of the VPN packet 2 is the public IP 2 (the public IP of the VPN gateway 302), and the source IP address is the public IP 1 (the public IP of the VPN gateway 303).

Step 20: The routing device of the internet 30 forwards the VPN packet 2 to the VPN gateway 302 based on the destination IP address of the VPN packet 2.

Step 21: The VPN gateway 302 receives the VPN packet 2, moves the VPN header of the VPN packet 2, obtains the VXLAN packet 2 from the payload of the VPN packet 2, and sends the VXLAN packet 2 to the VTEP device 302 based on the destination IP address of the outer packet of the VXLAN packet 2.

Step 22: The VTEP device 302 sends the ARP reply packet 1 to the PM 1.

In this step, the VTEP device 302 receives the VXLAN packet 2, decapsulates the VXLAN packet 2 to obtain the ARP reply packet 1 in the inner packet, obtains the VNI 0 carried in the VXLAN header of the VXLAN packet 2, selects the subnet 2 based on the VNI 0, and sends the ARP reply packet 1 to the PM 1 in the subnet 2.

The PM 1 receives ARP reply packet 1, determines, based on the MAC address (the L2 MAC 1) of the ARP reply packet 1 that the MAC address corresponding to 192.168.0.2 is the L2 MAC 1, and records 192.168.0.2 and the L2 MAC 1 in the local ARP entry of the PM 1.

Refer to FIG. 10A to FIG. 10D. FIG. 10A to FIG. 10D show a method in which the PM 1 communicates with the VM 1 after obtaining the L2 MAC 1. The method includes the following steps.

Step 23: The PM 1 sends the layer 2 packet 1 to the VTEP device 302.

The payload of the layer 2 packet 1 carries the IP packet 1, and a payload of the IP packet 1 carries the request information 1.

A quadruplet of the layer 2 packet 1 is:
   a source IP: 192.168.0.4;
   a destination IP: 192.168.0.2;
   a source MAC: the PM 1 MAC; and
   a destination MAC: the L2 MAC 1.

In this case, the PM 1 considers that the MAC address of the VM 1 is the L2 MAC 1.

Step 24: The VTEP device 302 sends a VXLAN packet 3 to the VPN gateway 303.

The VTEP device 302 encapsulates the layer 2 packet 1 into an inner packet of the VXLAN packet 3. A destination IP address of an outer packet of the VXLAN packet 3 is the VTEP IP 2 (the VTEP IP of the VTEP device 304), and a VXLAN header of the VXLAN packet 3 carries the tunnel identifier VNI 0 of the subnet 2.

An inner quadruplet and an outer quadruplet of the VXLAN packet 3 are as follows:
   the outer quadruplet:
     a source IP: the VTEP IP 3;
     a destination IP: the VTEP IP 2;
     a source MAC: the VTEP MAC 3; and
     a destination MAC: a next-hop MAC (the MAC address of the VPN gateway 302); and
   the inner quadruplet:
     a source IP: 192.168.0.4;
     a destination IP: 192.168.0.2;
     a source MAC: the PM 1 MAC; and
     a destination MAC: the L2 MAC 1.

Step 25: The VPN gateway 302 sends the VPN packet 3 to the internet 30.

After receiving the VXLAN packet 3, the VPN gateway 303 constructs the VPN packet 3 based on the VXLAN packet 3. A payload of the VPN packet 3 carries the VXLAN packet 3. A destination IP address of a VPN header of the VPN packet 3 is the public IP 1 (the public IP of the VPN gateway 303), and a source IP address is the public IP 2 (the public IP of the VPN gateway 302).

Step 26: The routing device of the internet 30 forwards the VPN packet 3 to the VPN gateway 303 based on a destination IP address of the VPN packet 3.

Step 27: The VPN gateway 302 sends the VXLAN packet 3 to the router 205.

After receiving the VPN packet 3, the VPN gateway 302 removes the VPN header, obtains the VXLAN packet 3 from the payload of the VPN packet 3, and sends the VXLAN packet 3 to the router 205.

Step 28: The router 205 sends the VXLAN packet 1 to the top of rack switch 207 based on the destination IP address of the outer packet of the VXLAN packet 1.

Step 29: The top of rack switch 207 sends the VXLAN packet 3 to the physical network interface card 2043.

Step 30: The physical network interface card 2043 sends the VXLAN packet 3 to the VTEP device 304.

Step 31: The VTEP device 304 decapsulates the VXLAN packet 3 to obtain the layer 2 packet 1 and the VNI 0.

Step 32: The VTEP device 304 sends the layer 2 packet 1 and the VNI 0 to the virtual port 3.

Step 33: The virtual port 3 sends the layer 2 packet 1 to the virtual port 1.

The virtual port 3 selects the virtual port 1 based on the VNI 0, and sends the layer 2 packet 1 to the virtual port 1, so that the layer 2 packet 1 arrives at the virtual network interface card 1 of the layer 2 gateway 200 through the virtual port 1.

Step 34: The layer 2 gateway 200 modifies the layer 2 packet 1.

The layer 2 gateway 200 obtains the layer 2 packet 1 from the virtual network interface card 1, determines, based on the destination MAC address of the layer 2 packet 1, that the layer 2 packet 1 is not the broadcast packet, and searches a MAC address that is the VM 1 MAC corresponding to the destination IP address (192.168.0.2) of the layer 2 packet 1.

The layer 2 gateway 200 modifies the source MAC address of the layer 2 packet 1 to the L2 MAC 2, and modifies the destination MAC address to the VM 1 MAC. A quadruplet of the modified layer 2 packet 1 is:

a source IP: 192.168.0.4;
a destination IP: 192.168.0.2;
a source MAC: the L2 MAC 2; and
a destination MAC: the VM 1 MAC.

The correspondence between 192.168.0.2 and the VM 1 MAC may be sent in advance by the control platform 201 to the layer 2 gateway 200 after the layer 2 gateway 200 is successfully created (or directly set in the layer 2 gateway 200 when the layer 2 gateway 200 is created). The layer 2 gateway 200 receives the correspondence, and records the correspondence in the local ARP entry of the layer 2 gateway 200.

Step 35: The layer 2 gateway 200 sends the modified layer 2 packet 1 to the virtual port 3.

The layer 2 gateway 200 sends the modified layer 2 packet 1 to the virtual port 2 by using the virtual network interface card 2, and the modified layer 2 packet 1 is transmitted to the virtual port 3 through the virtual port 2.

Step 36: The virtual port 3 receives the layer 2 packet 1 from the virtual port 2, determines the VNI 1 based on the virtual port 2, and sends the layer 2 packet 1 and the VNI 1 to the VTEP device 304.

Step 37: The VTEP device 304 determines the VTEP IP 1 (a VTEP IP of the VTEP device 305) based on the VNI 1, performs VXLAN encapsulation on the ARP reply packet 2 to generate a VXLAN packet 4. A VXLAN header of the VXLAN packet 4 carries the VNI 1, and an outer destination IP address of the VXLAN packet 4 is the VTEP IP 1.

An inner quadruplet and an outer quadruplet of the VXLAN packet 4 are as follows:

the outer quadruplet:
a source IP: the VTEP IP 2;
a destination IP: the VTEP IP 1;
a source MAC: a VTEP MAC 2; and
a destination MAC: a next-hop MAC; and
the inner quadruplet:
a source IP: 192.168.0.4;
a destination IP: 192.168.0.2;
a source MAC: the L2 MAC 2; and
a destination MAC: the VM 1 MAC.

Step 38: The VTEP device 304 sends the VXLAN packet 4 to the physical network interface card 2043.

Step 39: The physical network interface card 2043 sends the VXLAN packet 4 to the top of rack switch 207.

Step 40: The top of rack switch 207 sends the VXLAN packet 4 to the router 205.

Step 41: The router 205 sends the VXLAN packet 4 to the top of rack switch 206 based on the destination IP address of the outer packet of the VXLAN packet 4.

Step 42: The top of rack switch 206 sends the VXLAN packet 4 to the physical network interface card 2033.

Step 43: The physical network interface card 2033 sends the VXLAN packet 4 to the VTEP device 305.

Step 44: The VTEP device 305 decapsulates the VXLAN packet 4 to obtain the layer 2 packet 1 and the VNI 1.

Step 45: The VTEP device 305 sends the layer 2 packet 1 and the VNI 1 to the virtual port 7.

Step 46: The virtual port 7 sends the layer 2 packet 1 to the logical bridge 2034.

In this step, the virtual port 7 receives the layer 2 packet 2 and the VNI 1, selects the logical bridge 2034 based on the VNI 1, and sends the layer 2 packet 2 to the logical bridge 2034.

It should be noted that in some other examples, a VM of another VPC runs on the compute node 203. In this case, a virtual switch 1011 includes a plurality of logical bridges, each logical bridge is bound to a VNI of a different VPC, and the virtual port 7 selects a corresponding logical bridge based on the VNI.

In this step, the VNI 1 is bound to the logical bridge 2034, and the virtual port 3 determines, by the VNI 1, to send the layer 2 packet 2 to the logical bridge 2034.

Step 47: The logical bridge 2034 sends, based on the destination MAC address (the VM 1 MAC) of the layer 2 packet 1, the layer 2 packet 1 to the virtual port 5 connected to the virtual network interface card 3 of the VM 1.

Step 48: The virtual port 5 sends the layer 2 packet 1 to the virtual port 3 of the VM 1.

The VM 1 obtains the layer 2 packet 1 from the virtual network interface card 3, obtains the IP packet 1 from the payload of the layer 2 packet 1, obtains the request information 1 from the payload of the IP packet 1, and responds to the request information 1 to generate the reply information 1.

After generating the reply information 1, the VM 1 constructs the layer 2 packet 2. The payload of the layer 2 packet 2 carries the IP packet 2, and the payload of the IP packet 2 carries the reply information 1.

A quadruplet of the layer 2 packet 2 is:
a source IP: 192.168.0.2;
a destination IP: 192.168.0.4;
a source MAC: the VM 1 MAC; and
a destination MAC: the L2 MAC 2.

The source IP address and the destination IP address of the layer 2 packet 2 are obtained by inverting the source IP address and the destination IP address of the layer 2 packet 1, and the source MAC address and the destination MAC address of the layer 2 packet 2 are obtained by inverting the source MAC address and the destination MAC address of the layer 2 packet 1.

In addition, the VM 1 records the correspondence between the source MAC address (the L2 MAC 2) of the layer 2 packet 2 and the source IP address (192.168.0.4) of the layer 2 packet 2 in a local ARP entry of the VM 1.

Refer to FIG. 11A to FIG. 11D. FIG. 11A to FIG. 11D show a communication method that the VM 1 replies a packet. As shown in FIG. 11A to FIG. 11D, the method includes the following steps.

Step 49: The VM 1 sends the layer 2 packet 2 to the virtual port 5 by using the virtual network interface card 3.

Step 50: The virtual port 5 sends the layer 2 packet 2 to the logical bridge 2034.

Step 51: The logical bridge 2034 sends the layer 2 packet 2 to the virtual port 7.

In this step, the logical bridge 2034 does not locally have a virtual port that is bound to the L2 MAC 2, so that the logical bridge 2034 sends the layer 2 packet 2 to the virtual port 7.

Step 52: The virtual port 7 sends the layer 2 packet 2 and the VNI 1 to the VTEP device 305.

In this step, the virtual port 7 obtains the layer 2 packet 2 from the logical bridge 2034, and determines the VNI 1 based on the logical bridge 2034.

Step 53: The VTEP device 305 performs the VXLAN encapsulation on the layer 2 packet 2 to generate a VXLAN packet 5.

The VTEP device 305 determines the VTEP IP 2 based on the VNI 1. An inner packet of the VXLAN packet 5 is the layer 2 packet 2, a VXLAN header of the VXLAN packet 5 carries the VNI 1, an outer destination IP address of the VXLAN packet 5 is the VTEP IP 2, and a source IP address of outer packet 5 is the VTEP IP 1.

An inner quadruplet and an outer quadruplet of the VXLAN packet 5 are:
the outer quadruplet:
a source IP: the VTEP IP 1;
a destination IP: the VTEP IP 2;
a source MAC: a VTEP MAC 1; and
a destination MAC: the next-hop MAC; and
the inner quadruplet:
a source IP: 192.168.0.2;
a destination IP: 192.168.0.4;
a source MAC: the VM 1 MAC; and
a destination MAC: the L2 MAC 2.

Step 54: The VTEP device 305 sends the VXLAN packet 5 to the physical network interface card 2033.

Step 55: The physical network interface card 2033 sends the VXLAN packet 5 to the top of rack switch 206.

Step 56: The top of rack switch 206 sends the VXLAN packet 5 to the router 205.

Step 57: The router 205 sends the VXLAN packet 5 to the top of rack switch 207 based on the destination IP address of the outer packet of the VXLAN packet 5.

Step 58: The top of rack switch 207 sends the VXLAN packet 5 to physical network interface card 2043 based on the destination IP address of the outer packet of the VXLAN packet 5.

Step 59: The router 2043 sends the VXLAN packet 5 to the VTEP device 304 based on the destination IP address of the outer packet of the VXLAN packet 5.

Step 60: The VTEP device 304 performs VXLAN decapsulation on the VXLAN packet 5 to obtain the layer 2 packet 2 and the VNI 1.

Step 61: The VTEP device 304 sends the layer 2 packet 2 and the VNI 1 to the virtual port 3.

Step 62: The virtual port 3 selects the virtual port 2 based on the VNI 1, and sends the layer 2 packet 2 to the virtual port 2, and the layer 2 packet 2 is sent to the virtual network interface card 2 through the virtual port 2.

Step 63: The layer 2 gateway 200 obtains the layer 2 packet 2 from the virtual network interface card, and modifies the layer 2 packet 2.

The layer 2 gateway 200 obtains the layer 2 packet 2, searches for the PM 1 MAC corresponding to 192.168.0.4 in a local ARP entry of the layer 2 gateway 200 based on the destination IP address 192.168.0.4 of the layer 2 packet 2, modifies the destination MAC address of the layer 2 packet 2 to the PM 1 MAC, and modifies the source MAC address to the L2 MAC 1.

The correspondence between 192.168.0.4 and the PM 1 MAC has been recorded in the local ARP entry of the layer 2 gateway 200 in the foregoing step 12.

A quadruplet of the modified layer 2 packet 2 is:
a source IP: 192.168.0.2;
a destination IP: 192.168.0.4;
a source MAC: the L2 MAC 1; and
a destination MAC: the PM 1 MAC.

Step 64: The layer 2 gateway 200 sends the modified layer 2 packet 2 to the virtual port 1 by using the virtual network interface card 1, and virtual port 1 sends the modified layer 2 packet 2 to the virtual port 3.

Step 65: The virtual port 3 sends the layer 2 packet 2 and the VNI 0 to the VTEP device 304.

In this step, the virtual port 3 receives the layer 1 packet 2 from the virtual port 1, and determines the VNI 0 based on the virtual port 1.

Step 66: The VTEP device 304 determines the VTEP IP 3 (the VTEP IP address of the VTEP device 301) based on the VNI 0, and constructs a VXLAN packet 6. An inner packet of the VXLAN packet 6 is the layer 2 packet 2, a VXLAN header of the VXLAN packet 6 carries the VNI 0, an outer destination IP address is the VTEP IP 3, and a source IP address of outer packet is the VTEP IP 2.

An inner quadruplet and an outer quadruplet of the VXLAN packet 6 are:
the outer quadruplet:
a source IP: the VTEP IP 2;
a destination IP: the VTEP IP 3;
a source MAC: the VTEP MAC 2; and
a destination MAC: the next-hop MAC; and
the inner quadruplet:
a source IP: 192.168.0.2;
a destination IP: 192.168.0.4;
a source MAC: the L2 MAC 1; and
a destination MAC: the PM 1 MAC.

Step 67: The VTEP device 304 sends the VXLAN packet 6 to the physical network interface card 2043.

Step 68: The physical network interface card 2043 sends the VXLAN packet 6 to the top of rack switch 207.

Step 69: The top of rack switch 207 sends the VXLAN packet 6 to the router 205.

Step 70: The router 205 sends the VXLAN packet 6 to the VPN gateway 303 based on the destination IP address of the outer packet of the VXLAN packet 6.

Step 71: The VPN gateway 303 sends a VPN packet 4 to the internet 30.

After receiving the VXLAN packet 6, the VPN gateway 302 sets the VXLAN packet 6 in a payload of the VPN packet 4. A source IP address of a VPN header of the VPN packet 4 is the public IP 1, and a destination IP address is the public IP 2.

Step 72: The routing device of the internet 30 forwards the VPN packet 4 to the VPN gateway 302 based on the destination IP address of the VPN packet 4.

Step 73: The VPN gateway 302 removes the VPN header of the VPN packet 4, obtains the VXLAN packet 6 from the payload of the VPN packet 4, and sends the VXLAN packet 6 to the VTEP device 301 based on the destination IP address of the outer packet of the VXLAN packet 6.

Step 74: The VTEP device 301 receives the VXLAN packet 6, and decapsulates the VXLAN packet 6, to obtain the layer 2 packet 2 and the VNI 0, select the subnet 1 based on the VNI 0, and send the layer 2 packet 2 to the PM 1 in the subnet 1.

In this step, the PM 1 obtains the layer 2 packet 2, obtains the IP packet 2 from the payload of the layer 2 packet 2, and obtains the reply information 1 from the payload of the IP packet 2. In this case, request information sent by the PM 1 to the VM 1 is responded to by the VM 1, and communication between the PM 1 and the VM 1 is completed.

Further, in this step, the PM 1 may record the source MAC address (the L2 MAC 1) of the layer 2 packet 2 and the source IP address (192.168.0.2) of the layer 2 packet 2 in the local ARP entry.

In conclusion, the PM 1 is unaware of the layer 2 gateway 200 and a layer 2 communication tunnel. The PM 1 considers that the VM 1 and the PM 1 are in a same local area network (192.168.0.0/24). Therefore, in this embodiment of the present application, the PM 1 in the on-premises data center 10 and the VM 1 in the on-cloud data center 20 may be disposed in a same local area network.

FIG. 12A to FIG. 12D show a method that the VM 1 actively sends an ARP request packet to the PM 1. In this embodiment, the VM 1 actively communicates with the PM 1, and the VM 1 records only the private network address 192.168.0.4 of the PM 1. However, the local ARP entry of the VM 1 does not record a MAC address corresponding to 192.168.0.4. In this case, the VM 1 sends the ARP request packet to query the MAC address corresponding to 192.168.0.4. The method includes the following steps.

Step 1': The VM 1 sends the ARP request packet 2 to the virtual port 5.

A quadruplet of the ARP request packet 2 is:
a source IP: 192.168.0.2;
a destination IP: 192.168.0.4;
a source MAC: the VM 1 MAC; and
a destination MAC: FFFF FFFF FFFF.

Step 2': The virtual port 5 sends the ARP request packet 2 to the logical bridge 2034.

Step 3': The logical bridge 2034 sends the ARP reply packet 2 to the virtual port 5.

A quadruplet of the ARP reply packet 2 is:
a source IP: 192.168.0.4;
a destination IP: 192.168.0.2;
a source MAC: the L2 MAC 1; and
a destination MAC: the VM 1 MAC.

In this step, after receiving a packet sent by a virtual machine connected to the device manager 2031, when the logical bridge 2034 determines that a destination MAC address of the packet is FFFF FFFF FFFF, the logical bridge determines whether the received packet is the ARP request packet, and further determines whether a destination IP address of the ARP request packet is an occupied private network address (for example, 192.168.0.2 or 192.168.0.3) in the subnet 1.

If no, it indicates that the private network address is a private network address of the on-premises data center 10 in the cloud. The logical bridge 2034 intercepts the ARP request packet, and sends an ARP reply packet to the virtual machine. A source MAC address of the ARP reply packet is the L2 MAC 2, used to notify the VM 1 that the MAC address corresponding to 192.168.0.4 is the L2 MAC 2.

If yes, it indicates that the private network address is a private network address of the subnet 1, and the logical bridge 2034 broadcasts the ARP request packet in the subnet 1.

Step 4': The virtual port 5 sends the ARP reply packet 2 to the VM 1.

The VM 1 determines that the MAC address corresponding to 192.168.0.4 is the L2 MAC 1 based on the source MAC address of ARP request packet 2.

The VM 1 records the correspondence between 192.168.0.4 and the L2 MAC 1 in the local ARP entry of the VM 1.

After obtaining the L2 MAC 1, the VM 1 constructs the layer 2 packet 3 and sends the layer 2 packet 3 to the virtual port 5. A quadruplet of the layer 2 packet 3 is the same as that of the layer 2 packet 2, and a difference lies in that a payload of the layer 2 packet 3 carries the IP packet 3, and the payload of the IP packet 3 carries the request information 2 rather than the reply information 1. However, a data flow direction of the layer 2 packet 3 in the hybrid cloud communications system is completely the same as that of the layer 2 packet 2. Details are not described again.

It should be noted that, slightly different from the foregoing, when the layer 2 packet 3 arrives at the layer 2 gateway 200, if the local ARP entry of the layer 2 gateway 200 does not record a MAC address corresponding to the destination IP address (192.168.0.4) of the layer 2 packet 2, the layer 2 gateway 200 needs to send an ARP request packet to the subnet 2 by using the virtual network interface card 1 to obtain the MAC address corresponding to 192.168.0.4.

Further, after the layer 2 packet 3 sent by the VM 1 to the PM 1 arrives at the PM 1, a quadruplet of the layer 2 packet 4 that is constructed by the PM 1 and that is used to reply to the VM 1 is the same as that of the foregoing layer 2 packet 1. A difference lies in that the payload of the layer 2 packet 4 carries the IP packet 4, and the payload of the IP packet 4 carries the reply information 2 rather that the request information 1. However, a data flow direction of the layer 2 packet 4 in the hybrid cloud communications system is completely the same as that of the layer 2 packet 1, and therefore details are not described again.

In another embodiment of the present application, after determining that the received packet is the ARP request packet, the logical bridge 2034 may send the ARP request packet to the layer 2 gateway 200, and the layer 2 gateway 200 intercepts the ARP request packet and returns the ARP reply packet to the VM 1.

It should be noted that the logical bridge 2034 intercepts the ARP request packet, so that the ARP request packet may be prevented from being broadcast in the on-cloud data center 20.

In conclusion, in the embodiments shown in FIG. 9A to FIG. 12D, the process in which the VM 1 and the PM 1 perform layer 2 communication by using the layer 2 gateway 200 is described in detail.

Figure 13:
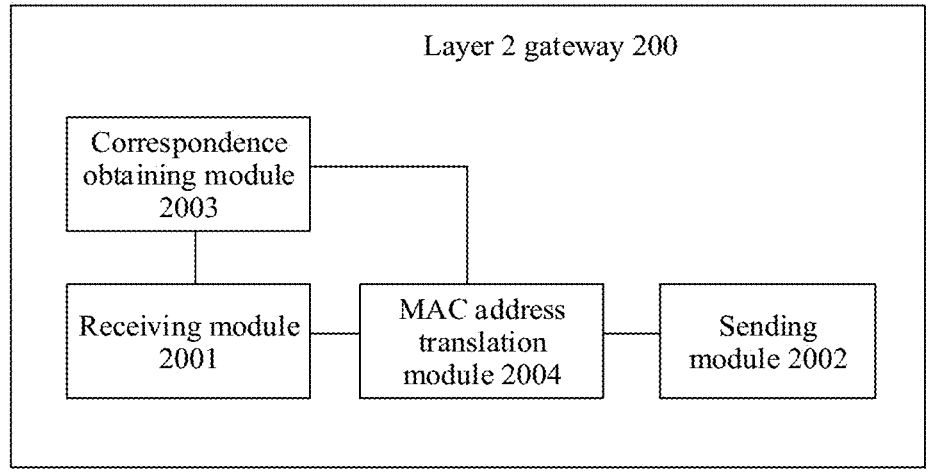
FIG. 13 is a schematic structural diagram of a layer 2 gateway in a hybrid cloud environment according to an embodiment of the present application.

FIG. 13 is a schematic structural diagram of a layer 2 gateway in a hybrid cloud environment according to an embodiment of the present application. As shown in FIG. 13, the layer 2 gateway 200 includes a receiving module 2001, a sending module 2002, a correspondence obtaining module 2003, and a MAC address translation module 2004. The receiving module 2001 is configured to perform an action of receiving a packet in the foregoing embodiments. The sending module 2002 is configured to perform an action of sending a packet in the foregoing embodiments. The correspondence obtaining module 2003 is configured to perform an action of learning and recording a correspondence between a private network address of a virtual machine and a MAC address of the virtual machine in the foregoing embodiments, and perform an action of learning and recording a correspondence between a private network address of a physical machine and a MAC address of the physical machine in the foregoing embodiments. The MAC address translation module 2004 is configured to perform an action of modifying a packet in the foregoing embodiments.

Figure 14:
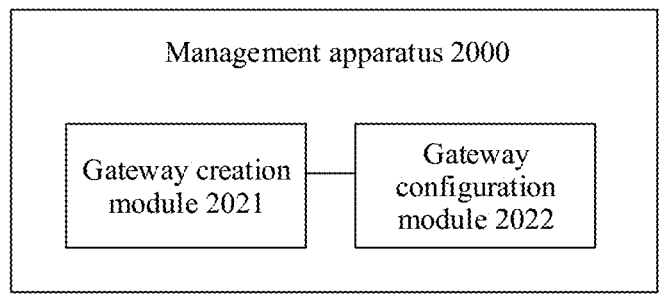
FIG. 14 is a schematic structural diagram of a management apparatus in a hybrid cloud environment according to an embodiment of the present application.

FIG. 14 is a schematic structural diagram of a management apparatus in a hybrid cloud environment according to an embodiment of the present application. As shown in FIG. 14, the management apparatus 2000 includes a gateway creation module 2021 and a gateway configuration module 2022. The gateway creation module 2021 is configured to perform a method for creating the layer 2 gateway 200 in the foregoing embodiments, and the gateway configuration module 2022 is configured to perform the method for configuring the layer 2 gateway 200 in the foregoing embodiments. The management apparatus 2000 may be disposed in the control platform 201 in the foregoing embodiment as a functional module of the control platform 201.

Figure 15:
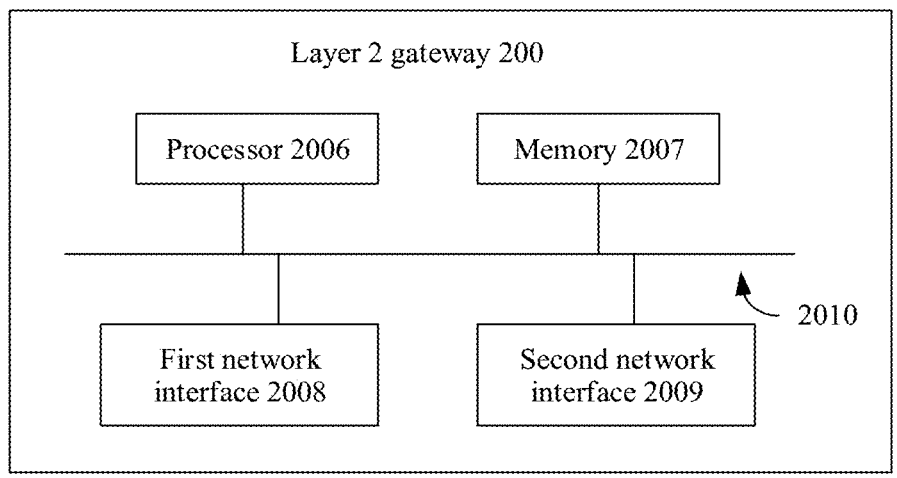
FIG. 15 is another schematic structural diagram of a layer 2 gateway according to an embodiment of the present application.

It should be noted that the layer 2 gateway 200 in FIG. 9A to FIG. 12D is implemented by software, a virtual machine, or a container that runs on the network node 204. However, this embodiment of the present application is not limited thereto. The layer 2 gateway 200 may be alternatively implemented by using a general-purpose computing device. For example, FIG. 15 is another schematic structural diagram of a layer 2 gateway according to an embodiment of the present application. As shown in FIG. 15, the layer 2 gateway 200 includes a processor 2006, a memory 2007, a first network interface 2008, a second network interface 2009, and a bus 2010. The memory 2007 stores a program instruction, and the processor 2006 executes the program instruction to implement related functions of the layer 2 gateway 200 in the foregoing embodiments.

It should be noted that, when the layer 2 gateway 200 is a general-purpose computing device, the virtual switch 2042 and the VTEP device 304 that are connected to the layer 2 gateway 200 in FIG. 9A to FIG. 12D may be implemented by using a VXLAN switch that has a switch function and a VXLAN encapsulation and decapsulation function.

For example, the layer 2 gateway 200 may be a general-purpose computing device that implements network functions virtualization (NFV).

Figure 16:
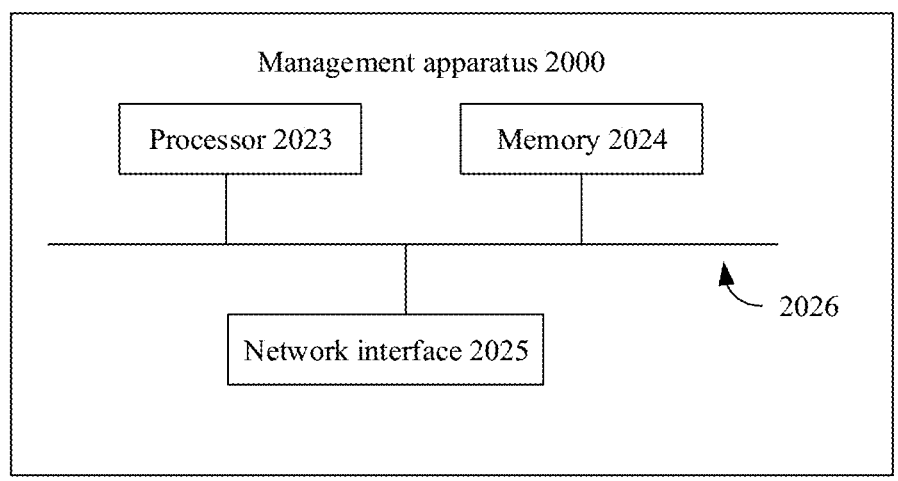
FIG. 16 is another schematic structural diagram of a management apparatus in a hybrid cloud environment according to an embodiment of the present application.

FIG. 16 is another schematic structural diagram of a management apparatus in a hybrid cloud environment according to an embodiment of the present application. As shown in FIG. 16, the management apparatus 2000 includes a processor 2023, a memory 2024, a network interface 2025, and a bus 2026. The memory 2024 stores a program instruction, and the processor 2023 executes the program instruction to implement the management method in the hybrid cloud environment in the foregoing embodiments.

An embodiment of the present application provides a computer program product for implementing a function of the foregoing layer 2 gateway, and a computer program product for implementing a function of the foregoing control platform. In addition, the foregoing computer program product includes a computer-readable storage medium that stores program code, and an instruction included in the program code is used to perform the method procedure described in any one of the foregoing method embodiments. An ordinary person skilled in the art may understand that the foregoing storage medium may include any non-transitory machine-readable medium capable of storing program code, such as a USB flash drive, a removable hard disk, a magnetic disk, an optical disc, a random-access memory (RAM), a solid-state drive (SSD), or a non-volatile memory.

It should be noted that the embodiments provided in this application are merely examples. A person skilled in the art may be clearly aware that for convenience and conciseness of description, in the foregoing embodiments, the embodiments emphasize different aspects, and for a part not described in detail in one embodiment, reference may be made to related description of another embodiment. Features disclosed in the embodiments, claims, and accompanying drawings in the present application may independently exist, or may exist in a combination manner. Features described in a hardware form in the embodiments of the present application may be executed by software, and features described in a software form in the embodiments of the present application may be executed by hardware. This is not limited herein.

What is claimed is:

1. A management method in a hybrid cloud environment comprising a first data center and a second data center, a same private network segment being configured for a first subnet of the first data center and a second subnet of the second data center, the method comprising:

creating, by a management apparatus, a gateway located in the second data center, wherein the gateway is remotely connected to the first subnet of the first data center through a communication tunnel, and the gateway is connected to the second subnet of the second data center;

configuring, by the management apparatus, the gateway to intercept a first address resolution protocol ARP request packet from a first device of the first subnet for a second device in the second subnet, and to return a first ARP reply packet to the first device, wherein the first ARP reply packet carries a first MAC address of the gateway; and configuring, by the management apparatus, the gateway to store a correspondence, carried in the first ARP request packet, between an IP address of the first device and a MAC address of the first device.

2. The method according to claim 1, wherein the method further comprises:

creating, by the management apparatus, a third device, wherein the third device is located in the second data center, wherein the third device is an image of the first device, and a private network address and a MAC address of the third device are the same as those of the first device; and shutting down, by the management apparatus, the first device.

3. The method according to claim 1, further comprising:

configuring, by the management apparatus, the gateway to receive a second ARP request packet that is from the second device in the second subnet and that is for the first device, and to return a second ARP reply packet to the second device, wherein the second ARP reply packet carries a second MAC address of the gateway.

4. The method according to claim 1, further comprising:

configuring, by the management apparatus, a device manager to receive a second ARP request packet from the second device and that is for the first device, and to return a second ARP reply packet to the second device, wherein the second ARP reply packet carries a second MAC address of the gateway, and the device manager is connected to the second device.

5. A gateway in a hybrid cloud environment, wherein the gateway is remotely connected to a first subnet of a first data center through a communication tunnel and is connected to a second subnet of a second data center, the first subnet and the second subnet having a same private network segment, wherein the first data center is configured to provide a non-public cloud service, the second data center is configured to provide a public cloud service, and the gateway comprises:

a processor, a memory, and a communications interface, wherein the memory is configured to store computer-executable instructions, and when the gateway operates, the processor runs the computer-executable instructions in the memory to:

receive a first address resolution protocol ARP request packet sent by a first device in the first subnet, wherein the first ARP request packet is used to request a MAC address of a second device in the second subnet;

send a first ARP reply packet to the first device, wherein the first ARP reply packet carries a first MAC address of the gateway; and obtain and record a first correspondence between a private network address of the second device and the MAC address of the second device in the second subnet.

6. The gateway according to claim 5, wherein the processor runs the computer-executable instructions in the memory to further:
receive a first packet sent by the first device through the communication tunnel, wherein a destination IP address of the first packet comprises the private network address of the second device, a destination MAC address of the first packet comprises the first MAC address of the gateway, a source IP address of the first packet comprises a private network address of the first device, and a source MAC address of the first packet comprises a MAC address of the first device;
obtain the MAC address of the second device from the first correspondence based on the private network address of the second device carried in the first packet, modify the destination MAC address of the first packet to the MAC address of the second device, and modify the source MAC address of the first packet to a second MAC address of the gateway; and
send a modified first packet to the second device.

7. The gateway according to claim 6, wherein a source IP address of the first ARP request packet comprises the private network address of the first device, a source MAC address of the first ARP request comprises the MAC address of the first device, and the processor runs the computer-executable instructions in the memory to further:
learn and record a second correspondence between the private network address of the first device and the MAC address of the first device.

8. The gateway according to claim 7, wherein the processor runs the computer-executable instructions in the memory to further:
receive a second packet sent by the second device, wherein a destination IP address of the second packet comprises the private network address of the first device, a destination MAC address of the second packet comprises the second MAC address of the gateway, a source IP address of the second packet comprises the private network address of the first device, and a source MAC address of the second packet comprises the MAC address of the second device;
obtain the MAC address of the first device from the second correspondence based on the private network address of the first device carried in the second packet, modify the destination MAC address of the second packet to the MAC address of the first device, and modify the source MAC address of the second packet to the first MAC address of the gateway; and
send a modified second packet to the first device through the communication tunnel.

9. The gateway according to claim 8, wherein before the receiving module receives the second packet sent by the second device, the processor runs the computer-executable instructions in the memory to further:
receive a second ARP request packet sent by the second device, wherein the second ARP request packet is used to request the MAC address of the first device in the first subnet; and
send a second ARP reply packet to the second device, wherein the second ARP reply packet carries the second MAC address of the gateway.

10. A management apparatus in a hybrid cloud environment, comprising a first data center and a second data center, wherein a same private network segment is configured for a first subnet of the first data center and a second subnet of the second data center, and the management apparatus comprising:

a processor, a memory, and a communications interface, wherein the memory is configured to store computer-executable instructions, and when the management apparatus operates, the processor runs the computer-executable instructions in the memory to:
create a gateway located in the second data center, wherein the gateway is remotely connected to the first subnet of the first data center through a communication tunnel, and the gateway is connected to the second subnet of the second data center;
configure the gateway to intercept a first address resolution protocol ARP request packet from a first device in the first subnet and that is for a second device in the second subnet, and return a first ARP reply packet to the first device, wherein the first ARP reply packet carries a first MAC address of the gateway; and
configure the gateway to store a correspondence, carried in the first ARP request packet, between an IP address of the first device and a MAC address of the first device.

11. The management apparatus according to claim 10, wherein the processor runs the computer-executable instructions in the memory to further:
create a third device, wherein the gateway is located in the second data center, the third device is an image of the first device, and a private network address and a MAC address of the third device are the same as those of the first device; and
shut down the first device.

12. The management apparatus according to claim 10, wherein the processor runs the computer-executable instructions in the memory to further:
configure the gateway to receive a second ARP request packet from the second device in the second subnet and that is for the first device, and return a second ARP reply packet to the second device, wherein the second ARP reply packet carries a second MAC address of the gateway.

13. The management apparatus according to claim 12, wherein the processor runs the computer-executable instructions in the memory to further:
configure a device manager that is connected to the second device in the second subnet to receive the second ARP request packet from the second device and that is for the first device, and return the second ARP reply packet to the second device, wherein the second ARP reply packet carries a second MAC address of the gateway.

14. The gateway according to claim 5, wherein the gateway comprises a general-purpose computing device, and the communications interface comprises a first network interface and a second network interface.

15. The gateway according to claim 5, wherein the gateway includes a receiving module, a sending module, a correspondence obtaining module, and a MAC address translation module, wherein the receiving module is configured to receive a layer 2 packet, the correspondence obtaining module is configured to learn and record a first correspondence between a private network address of a virtual machine and a MAC address of the virtual machine, and learn and record a second correspondence between a private network address of a physical machine and a MAC address of the physical machine, the MAC address translation module is configured to modify the layer 2 packet to generate a modified layer 2 packet, and the sending module is configured to send the modified layer 2 packet.

16. The method according to claim 1, wherein the gateway is a layer 2 gateway.

17. The method according to claim 16, further comprising configuring an interception module on the layer 2 gateway, where the interception module is configured to intercept the first address resolution protocol ARP request packet.

18. The method according to claim 16, further comprising configuring, on the layer 2 gateway, a learning module configured to learn and record the correspondence between the IP address of the first device and the MAC address of the first device.

19. The method according to claim 16, further comprising configuring, on the layer 2 gateway, a reply module configured to receive a second ARP request packet that is from the second device in the second subnet and that is for the first device, and to return a second ARP reply packet to the second device, wherein the second ARP reply packet carries a second MAC address of the gateway.

* * * * *